US012076988B2

(12) United States Patent
Miyagishi

(10) Patent No.: US 12,076,988 B2
(45) Date of Patent: Sep. 3, 2024

(54) LIQUID EJECTING HEAD AND LIQUID EJECTING APPARATUS

(71) Applicant: SEIKO EPSON CORPORATION, Tokyo (JP)

(72) Inventor: Akira Miyagishi, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 51 days.

(21) Appl. No.: 17/976,953

(22) Filed: Oct. 31, 2022

(65) Prior Publication Data

US 2023/0136625 A1 May 4, 2023

(30) Foreign Application Priority Data

Nov. 2, 2021 (JP) ................................ 2021-179518

(51) Int. Cl.
*B41J 2/14* (2006.01)

(52) U.S. Cl.
CPC ................................ *B41J 2/14201* (2013.01)

(58) Field of Classification Search
CPC ...... B41J 2/1404; B41J 2/045; B41J 2/14233; B41J 2/14201; B41J 2202/11; B41J 2002/14491
See application file for complete search history.

(56) References Cited

U.S. PATENT DOCUMENTS

2017/0210131 A1 7/2017 Naito
2019/0291433 A1* 9/2019 Kato .................. B41J 2/14233

FOREIGN PATENT DOCUMENTS

JP 2021-130258 A 9/2021

* cited by examiner

*Primary Examiner* — Thinh H Nguyen
(74) *Attorney, Agent, or Firm* — Harness, Dickey & Pierce, P.L.C.

(57) ABSTRACT

A liquid ejecting head includes a line of first pressure chambers, a line of second pressure chambers, a line of nozzles including nozzles arranged in a first direction, first piezoelectric bodies, first individual electrodes, a first common electrode, second piezoelectric bodies, second individual electrodes, a second common electrode, a wiring member, a first individual line that electrically couples the first individual electrode to the wiring member, a first common line that electrically couples the first common electrode to the wiring member, a second individual line that electrically couples the second individual electrode to the wiring member, and a second common line that electrically couples the second common electrode to the wiring member. The wiring member is electrically coupled to the first common line at a position shifted to one side in the first direction relative to a center in the first direction of the lines of first and second pressure chambers, and the wiring member is electrically coupled to the second common line at a position shifted to another side in the first direction relative to the center in the first direction of the lines of first and second pressure chambers.

16 Claims, 19 Drawing Sheets

LIQUID EJECTING HEAD AND LIQUID EJECTING APPARATUS

The present application is based on, and claims priority from JP Application Serial Number 2021-179518, filed Nov. 2, 2021, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head includes pressure chambers that store a liquid, vibration plates formed above the pressure chambers, actuators that drive the vibration plates, and a wiring member that supplies signals to the actuators (see JP-A-2021-130258, for example). The actuators include individual electrodes provided to the pressure chambers, respectively, a common electrode provided to the individual electrodes in common, and piezoelectric bodies disposed in a space between the individual electrodes and the common electrode.

The liquid ejecting head includes a line of nozzles and lines of pressure chambers. The line of nozzles includes nozzles arranged in a predetermined direction. Each nozzle communicates with at least one pressure chamber. The lines of pressure chambers extend in a direction of extension of the line of nozzles. The lines of pressure chambers are located away from each other in a direction intersecting with the direction of extension of the line of nozzles.

In the liquid ejecting head, a signal outputted from a driving circuit is supplied to the common electrode through a wiring board and common lines. The common lines extend along a first direction which is the direction of extension of the line of pressure chambers. The wiring board is electrically coupled to the common lines through common line mounting portions. A voltage supplied to the actuator located far from each common line mounting portion is lower than a voltage supplied to the actuator located close to the common line mounting portion. To be more precise, since the common line mounting portions are located at two end portions in the first direction of the common lines, there is a problem that the voltage supplied to an actuator located at a central part is lower than the voltage supplied to an actuator located on an outer side. Accordingly, when there is a large variation in voltage supplied to the actuators arranged in the first direction, it is likely that ejection of a liquid varies among the nozzles arranged in the first direction.

SUMMARY

A liquid ejecting head according to an aspect of the present disclosure includes: a line of first pressure chambers including a plurality of first pressure chambers arranged in a first direction; a line of second pressure chambers including a plurality of second pressure chambers arranged in the first direction, the line of second pressure chambers being provided at a different position from the first pressure chambers in a second direction intersecting with the first direction; a line of nozzles including a plurality of nozzles arranged in the first direction and communicating with the first pressure chambers and the second pressure chambers in common, respectively; first piezoelectric bodies provided corresponding to the plurality of first pressure chambers; first individual electrodes individually provided to the plurality of first pressure chambers and being electrically coupled to the first piezoelectric bodies; a first common electrode provided in common to the plurality of first pressure chambers and electrically coupled to the first piezoelectric bodies; second piezoelectric bodies provided corresponding to the plurality of second pressure chambers; second individual electrodes individually provided to the plurality of second pressure chambers and being electrically coupled to the second piezoelectric bodies; a second common electrode provided in common to the plurality of second pressure chambers and electrically coupled to the second piezoelectric bodies; a wiring member that supplies a voltage to the first individual electrodes, the first common electrode, the second individual electrodes, and the second common electrode; a first individual line that electrically couples the first individual electrode to the wiring member; a first common line that electrically couples the first common electrode to the wiring member; a second individual line that electrically couples the second individual electrode to the wiring member; and a second common line that electrically couples the second common electrode to the wiring member. The wiring member is electrically coupled to the first common line at a position shifted to one side in the first direction relative to a center in the first direction of the lines of first and second pressure chambers, and the wiring member is electrically coupled to the second common line at a position shifted to another side in the first direction relative to the center in the first direction of the lines of first and second pressure chambers.

A liquid ejecting head according to another aspect of the present disclosure includes: a line of first pressure chambers including a plurality of first pressure chambers arranged in a first direction; a line of second pressure chambers including a plurality of second pressure chambers arranged in the first direction, the line of second pressure chambers being provided at a different position from the first pressure chambers in a second direction intersecting with the first direction; a line of first nozzles including a plurality of first nozzles arranged in the first direction and communicating with the plurality of first pressure chambers, respectively; a line of second nozzles including a plurality of second nozzles arranged in the first direction and communicating with the plurality of second pressure chambers, respectively; first piezoelectric bodies provided corresponding to the plurality of first pressure chambers; first individual electrodes individually provided to the plurality of first pressure chambers and being electrically coupled to the first piezoelectric bodies; a first common electrode provided in common to the plurality of first pressure chambers and electrically coupled to the first piezoelectric bodies; second piezoelectric bodies provided corresponding to the plurality of second pressure chambers; second individual electrodes individually provided to the plurality of second pressure chambers and being electrically coupled to the second piezoelectric bodies; a second common electrode provided in common to the plurality of second pressure chambers and electrically coupled to the second piezoelectric bodies; a wiring member that supplies a voltage to the first individual electrodes, the first common electrode, the second individual electrodes, and the second common electrode; a first individual line that electrically couples the first individual electrode to the wiring member; a first common line that electrically couples the first common electrode to the wiring member; a second individual line that electrically couples the second individual electrode to the wiring member; and a second common line that electrically couples the second common electrode to the wiring member. The wiring member is electrically coupled to the first common line at a position shifted to one side in the first direction relative to a center in the first direction of the lines of first and second pressure chambers, and the wiring member is electrically coupled to the second common line at a position shifted to another side in the first direction relative to the center in the first direction of the lines of first and second pressure chambers.

A liquid ejecting apparatus according to still another aspect of the present disclosure includes the above-described liquid ejecting head, and a control unit that controls an operation of ejection from the liquid ejecting head.

DESCRIPTION OF EXEMPLARY EMBODIMENTS

Figure 1:
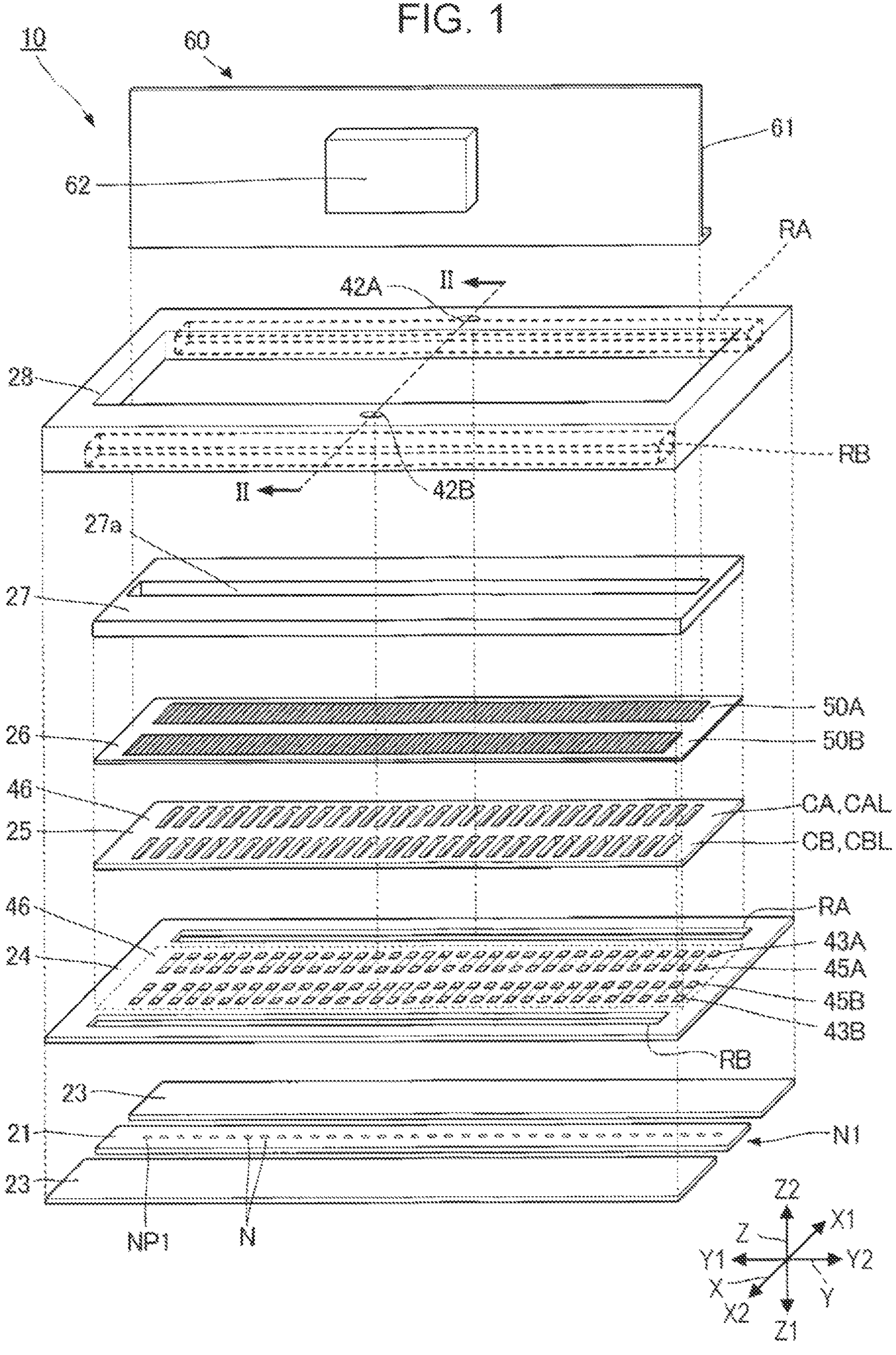
FIG. 1 is an exploded perspective view illustrating a liquid ejecting head according to Embodiment 1.

Embodiments of the present disclosure will be described below with reference to the drawings. It is to be noted, however, that dimensions and scales of components in the drawings are different from those of actual ones as needed. The embodiments described below represent specific preferred examples of the present disclosure and are therefore provided with various technically desirable limitations. Nevertheless, the scope of the present disclosure is not limited to these embodiments unless the following description expressly states the specific limitations of the present disclosure.

In the following description, three directions intersecting with one another may be explained as x-axis direction, y-axis direction, and z-axis direction, respectively. The x-axis direction includes x1 direction and x2 direction which are mutually opposite directions. The x-axis direction represents an example of a second direction. The y-axis direction includes y1 direction and y2 direction which are mutually opposite directions. The y-axis direction represents an example of a first direction. The z-axis direction includes z1 direction and z2 direction which are mutually opposite directions. The z1 direction represents an example of a third direction. The x-axis direction, the y-axis direction, and the z-axis direction are orthogonal to one another. Although the z-axis direction is usually a direction along an up-down direction, the z-axis direction does not always have to be the direction along the up-down direction.

Embodiment 1

Figure 2:
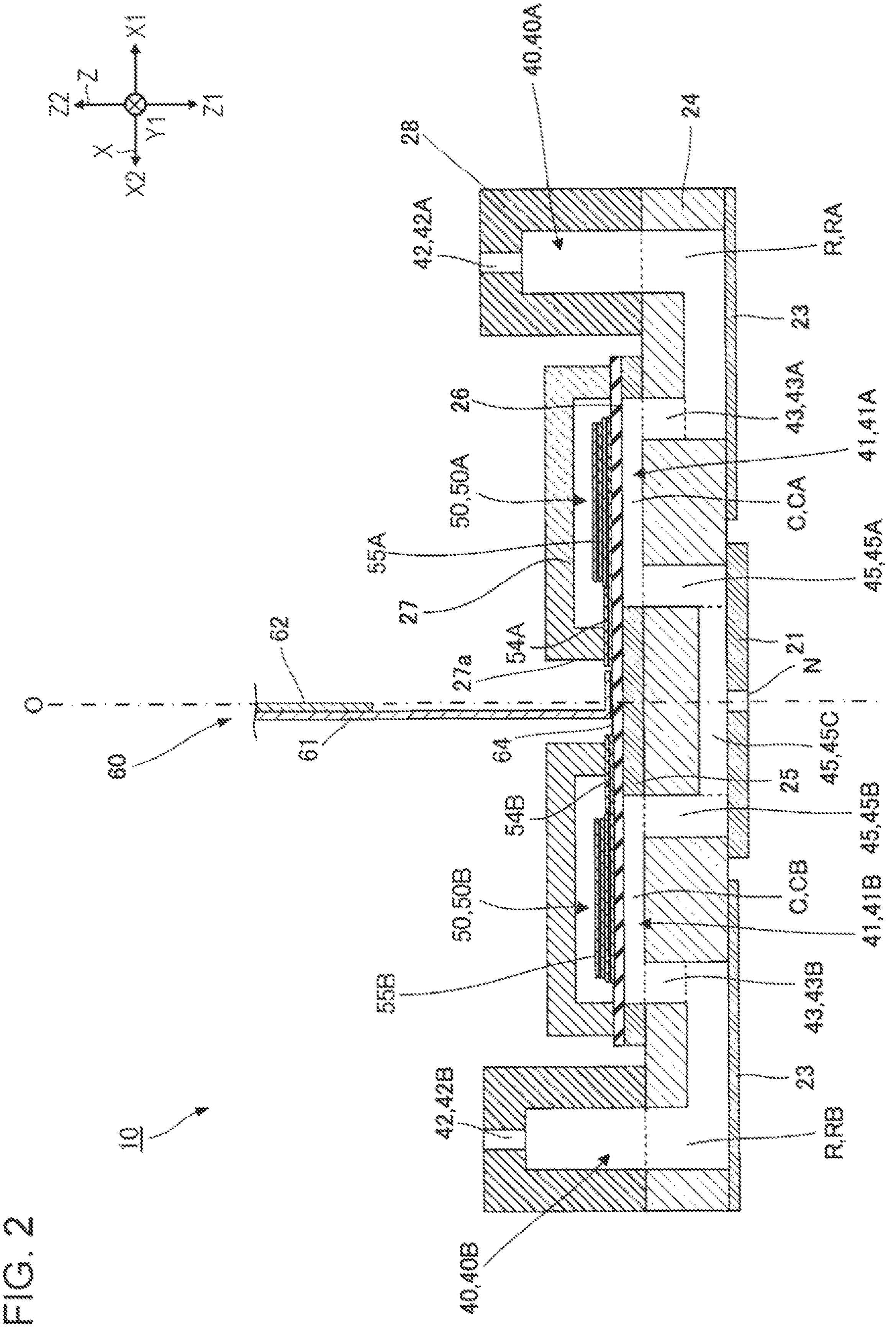
FIG. 2 is a sectional view illustrating the liquid ejecting head, which is a diagram illustrating a section taken along the II-II line in FIG. 1.
Figure 3:
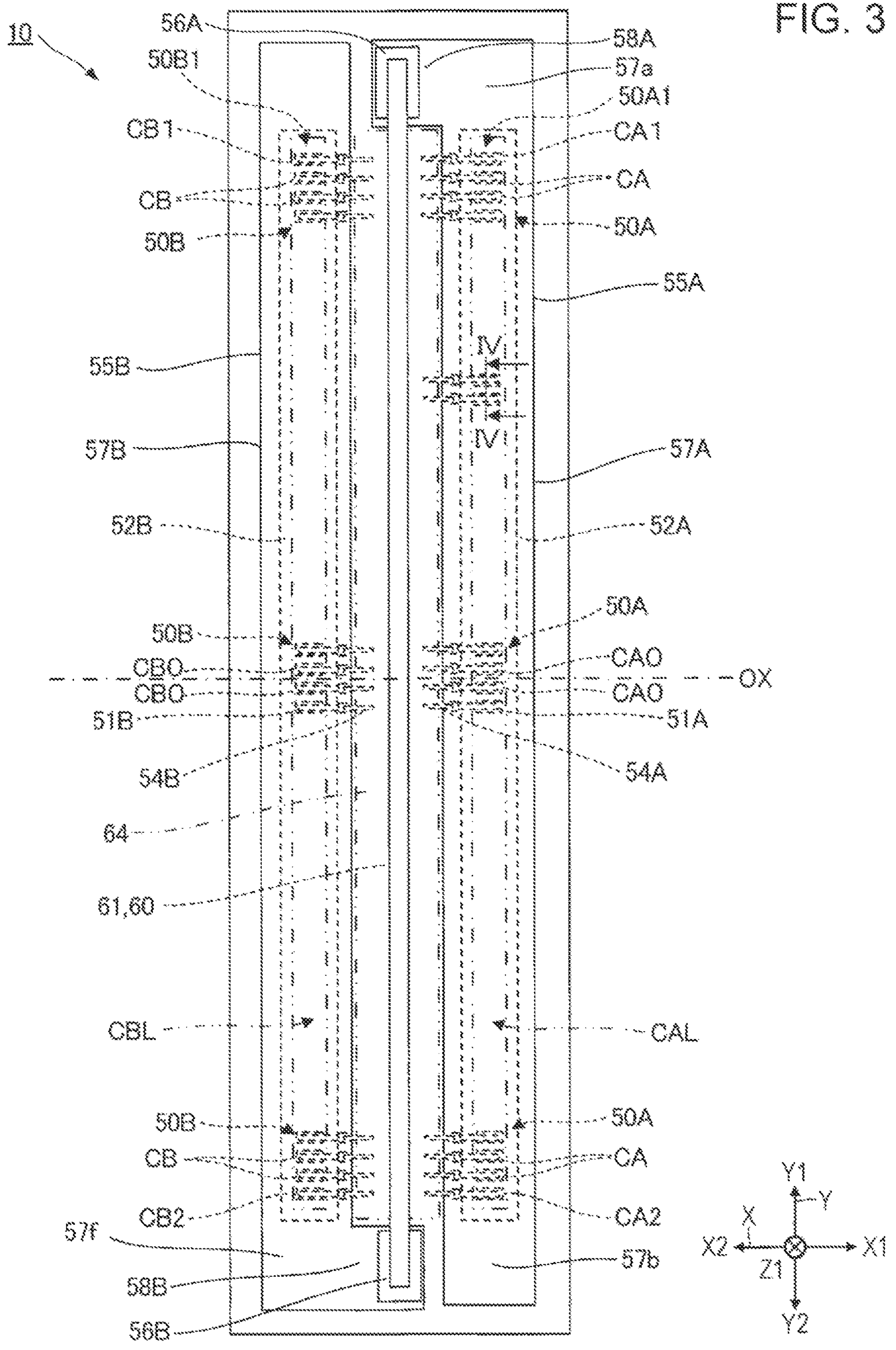
FIG. 3 is a plan view illustrating the liquid ejecting head.
Figure 4:
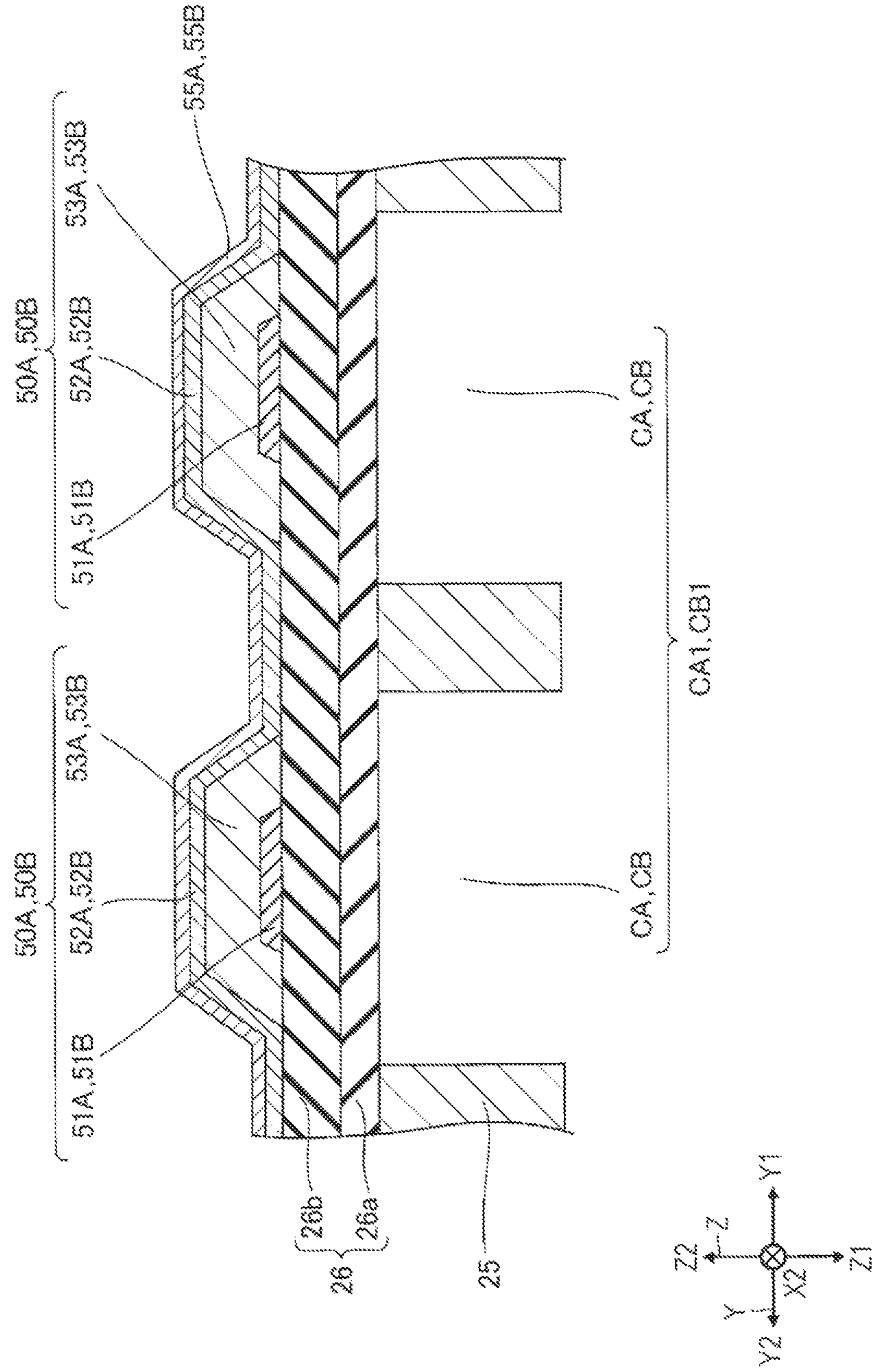
FIG. 4 is a sectional view illustrating a section taken along the IV-IV line in FIG. 3.
Figure 5:
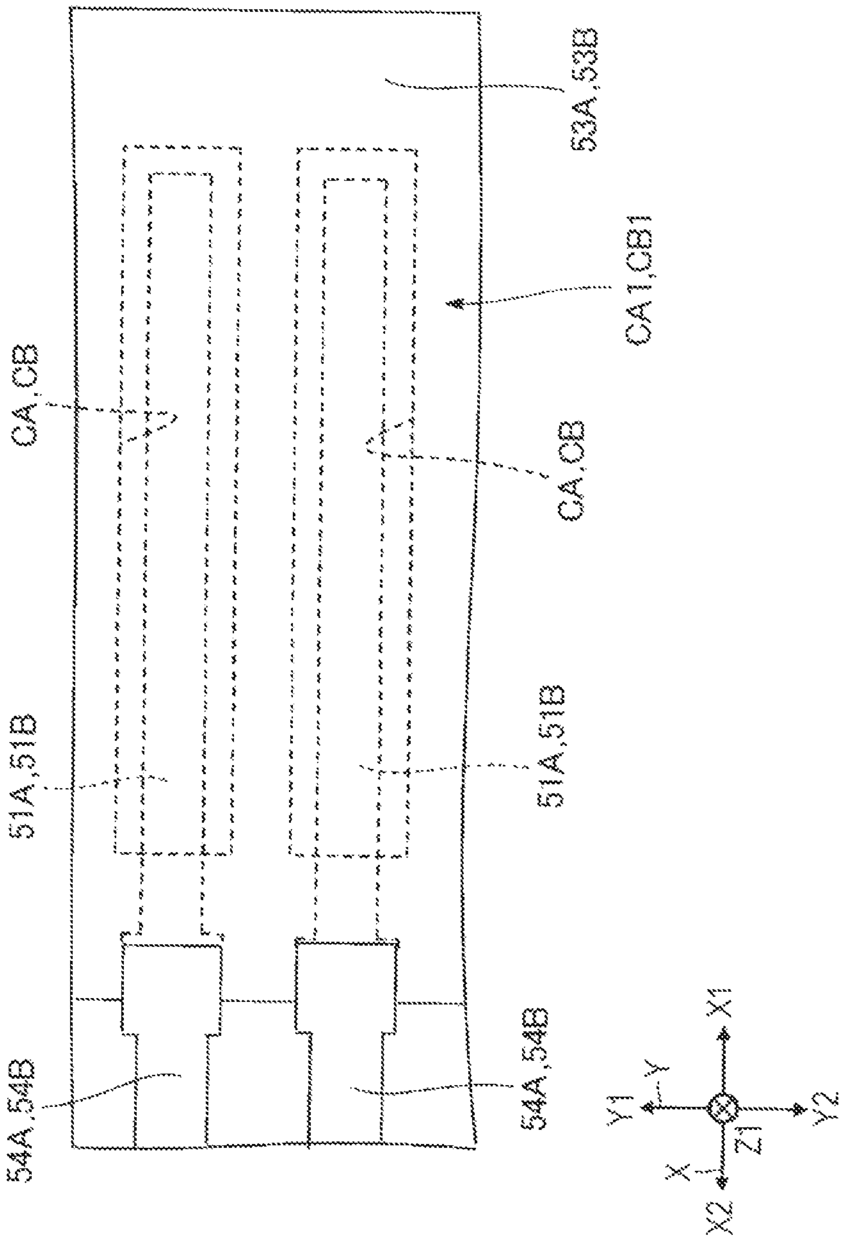
FIG. 5 is a plan view illustrating pressure chambers, individual electrodes, and COM lines.
Figure 6:
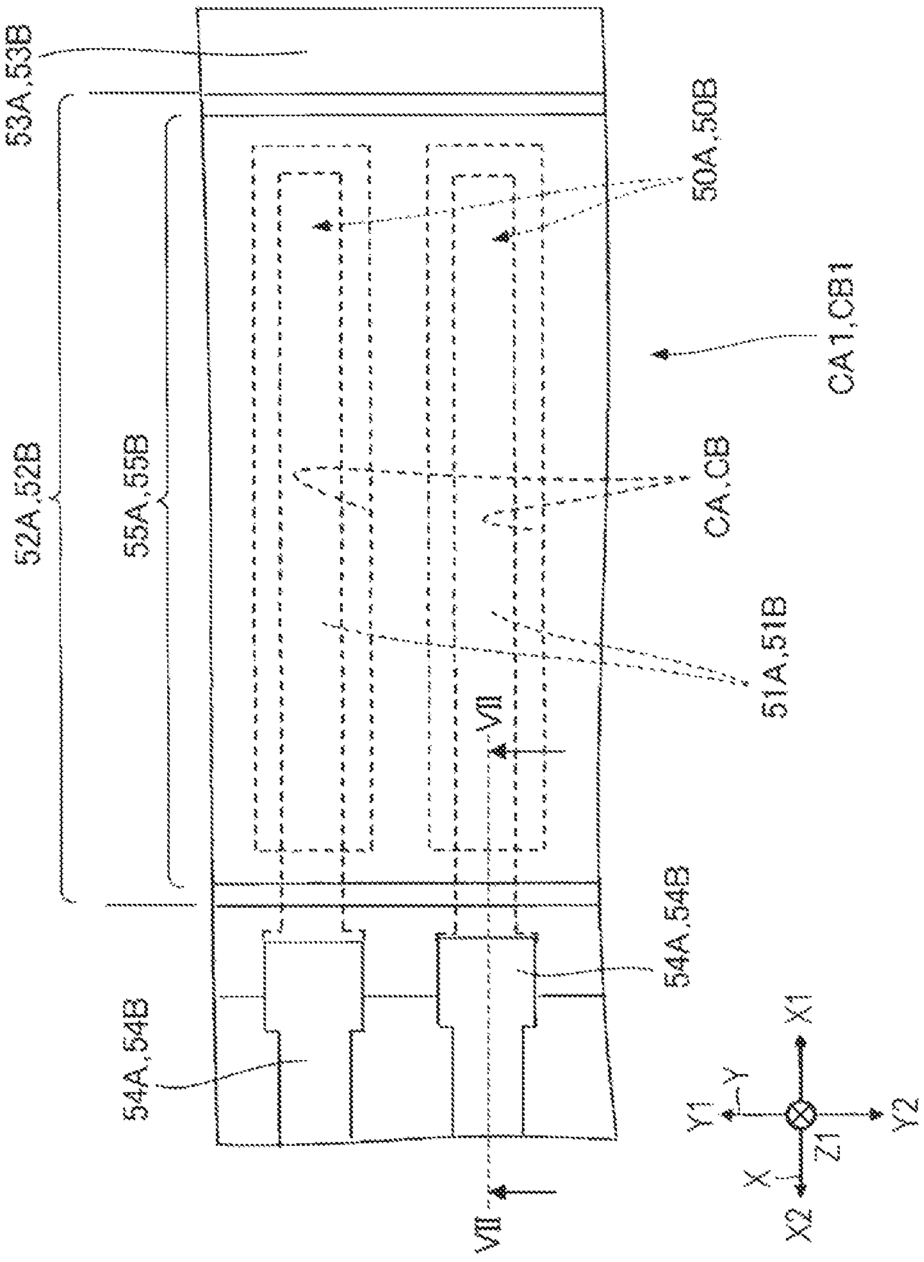
FIG. 6 is a plan view illustrating a common electrode and a VBS line.

A liquid ejecting head 10 according to Embodiment 1 will be described with reference to FIGS. 1 to 8. FIG. 1 is an exploded perspective view illustrating the liquid ejecting head 10 according to the Embodiment 1. FIG. 2 is a sectional view illustrating the liquid ejecting head 10, which is a diagram illustrating a section taken along the II-II line in FIG. 1. FIG. 3 is a plan view illustrating the liquid ejecting head 10. FIG. 4 is a sectional view illustrating a section taken along the IV-IV line in FIG. 3. FIG. 5 is a plan view illustrating pressure chambers CA, individual electrodes 51A, and COM lines 54A. FIG. 6 is a plan view illustrating a common electrode 52A and a VBS line 55A. The liquid ejecting head 10 adopts a circulation system that circulates a liquid flowing in common liquid chambers RA and RB and pressure chambers CA and CB.

As illustrated in FIG. 1, the liquid ejecting head 10 includes a line of pressure chambers CAL and a line of pressure chambers CBL. The line of pressure chambers CAL includes the pressure chambers CA arranged in the y-axis direction. The line of pressure chambers CBL includes the pressure chambers CB arranged in the y-axis direction. Each pressure chamber CA represents an example of a "first pressure chamber". Each pressure chamber CB represents an example of a "second pressure chamber". The line of pressure chambers CAL represents an example of a "line of first pressure chambers" and the line of pressure chambers CBL represents an example of a "line of second pressure chambers". As illustrated in FIGS. 1 and 3, the line of pressure chambers CAL and the line of pressure chambers CBL are located away from each other in the x-axis direction. Although the line of pressure chambers CAL is illustrated in FIGS. 4 to 6, the line of pressure chambers CBL is supposed to be the same and the illustration thereof will be omitted. FIG. 3 illustrates part of the pressure chambers CA and CB.

Terms "line A side" and "line B side" will be used in the present specification. The term "line A side" will be used when indicating something related to the "line of pressure chambers CAL" while the term "line B side" will indicate something related to the "line of pressure chambers CBL". For example, a description "a piezoelectric element 50A on the line A side" represents a piezoelectric element 50A that changes a pressure of a liquid inside a pressure chamber CA in the line of pressure chambers CAL. A description "a VBS line 55A on the line A side" represents a VBS line 55A that supplies a voltage to a common electrode 52A of the piezoelectric element 50A.

FIG. 3 illustrates a center line OX that passes through the centers in the y-axis direction of the lines of pressure chambers CAL and CBL and extends in the x-axis direction. The line of pressure chambers CAL includes pressure chambers CA0, CA1, and CA2. The pressure chamber CA0 is one of the pressure chambers CA which is located at the center in the y-axis direction. The pressure chamber CA0 is the pressure chamber CA located closest to the center line OX in the y-axis direction. When the center line OX is located between two pressure chambers CA, then these pressure chambers CA are the pressure chambers CA0.

The pressure chamber CA1 is the pressure chamber CA among the pressure chambers CA, which is located at one end in the y-axis direction. The pressure chamber CA1 is located farthest in the y1 direction from the center line OX in the y-axis direction. The pressure chamber CA2 is the pressure chamber CA among the pressure chambers CA, which is located at another end in the y-axis direction. The pressure chamber CA2 is located farthest in the y2 direction from the center line OX in the y-axis direction.

The line of pressure chambers CBL includes pressure chambers CB0, CB1, and CB2. The pressure chamber CB0 is one of the pressure chambers CB which is located at the center in the y-axis direction. The pressure chamber CB0 is the pressure chamber CB located closest to the center line OX in the y-axis direction.

The pressure chamber CB1 is the pressure chamber CB among the pressure chambers CB, which is located at one end in the y-axis direction. The pressure chamber CB1 is located farthest in the y1 direction from the center line OX in the y-axis direction. The pressure chamber CB2 is the pressure chamber CB among the pressure chambers CB, which is located at another end in the y-axis direction. The pressure chamber CB2 is located farthest in the y2 direction from the center line OX in the y-axis direction.

The liquid ejecting head 10 includes a nozzle plate 21, compliance substrates 23, a communication plate 24, a pressure chamber substrate 25, a vibration plate 26, a sealing plate 27, and piezoelectric elements 50A and 50B. The liquid ejecting head 10 includes a casing 28 and a COF 60. The COF stands for chip on film. The present embodiment will describe the liquid ejecting head 10 that ejects an ink representing an example of a liquid. However, the liquid is not limited only to the ink, so that the liquid ejecting head 10 can eject other liquids.

A thickness direction of each of the nozzle plate 21, the compliance substrates 23, the communication plate 24, the pressure chamber substrate 25, the vibration plate 26, the sealing plate 27, and the casing 28 extends in the z-axis direction. The nozzle plate 21 and the compliance substrates 23 are disposed at a bottom portion of the liquid ejecting head 10. The communication plate 24 is disposed in the z2 direction relative to the nozzle plate 21 and the compliance substrates 23. The pressure chamber substrate 25 is disposed in the z2 direction relative to the communication plate 24. The vibration plate 26 is disposed in the z2 direction relative to the pressure chamber substrate 25. The piezoelectric elements 50A and 50B are formed on the vibration plate 26. The sealing plate 27 is disposed in the z2 direction relative to the vibration plate 26. The sealing plate 27 covers the piezoelectric elements 50. The casing 28 is disposed above the communication plate 24. The piezoelectric elements 50A are provided corresponding to the pressure chambers CA. The piezoelectric elements 50B are provided corresponding to the pressure chambers CB. Each piezoelectric element 50A may also be referred to as a "first piezoelectric element". Each piezoelectric element 50B may also be referred to as a "second piezoelectric element". The "piezoelectric element 50A" and the "piezoelectric element 50B" may collectively be referred to as the "piezoelectric elements 50" when the "piezoelectric element 50A" and the "piezoelectric element 50B" need not be distinguished from each other.

Next, a description will be given of a flow channel 40 in which the ink flows. The liquid ejecting head 10 is provided with the flow channel 40 in which the ink flows. The flow channel 40 includes a supply port 42A, a discharge port 42B, the common liquid chambers RA and RB, relay flow channels 43A and 43B, the pressure chambers CA and CB, communication flow channels 45A to 45C, and nozzles N.

The flow channel 40 includes individual flow channels 41. The individual flow channels 41 are provided corresponding to the nozzles N, respectively. The individual flow channels 41 include individual flow channels 41A and individual flow channels 41B. Each individual flow channel 41A includes the relay flow channel 43A, the pressure chamber CA, the communication flow channel 45A, and part of the communication flow channel 45C. The common liquid chamber RA communicates with the individual flow channels 41A in common, and supplies the ink to the individual flow channels 41A. The common liquid chamber RA represents an example of a common supply flow channel. Each individual flow channel 41A is a portion of the individual flow channel 41 located upstream of the corresponding nozzle N.

Each individual flow channel 41B includes the relay flow channel 43B, the pressure chamber CB, the communication flow channel 45B, and part of the communication flow channel 45C. The common liquid chamber RB communicates with the individual flow channels 41B in common. The ink is discharged from the individual flow channels 41B to the common liquid chamber RB. The common liquid chamber RB discharges the ink from the individual flow channels 41B. The common liquid chamber RB represents an example of a common discharge flow channel.

Figure 18:
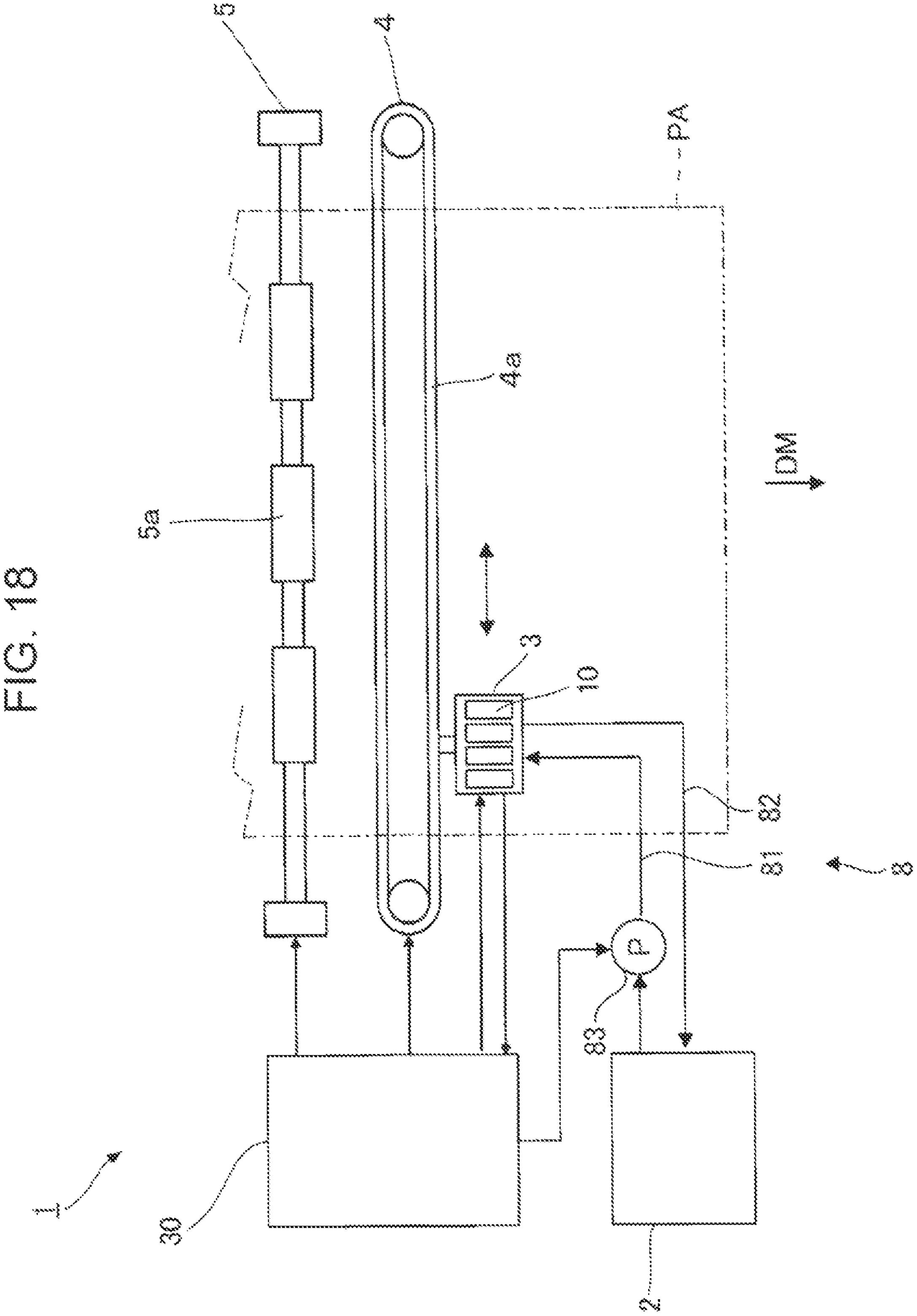
FIG. 18 is a schematic diagram illustrating a liquid ejecting apparatus including a liquid ejecting head.

The liquid ejecting head 10 adopts a circulation system designed to circulate the ink that flows in the pressure chambers CA and CB. As illustrated in FIG. 18, a circulation mechanism 8 to circulate the ink is coupled to the liquid ejecting head 10. A liquid container 2 is coupled to the circulation mechanism 8. The circulation mechanism 8 includes a supply flow channel 81 that supplies the ink to the liquid ejecting head 10, a collection flow channel 82 that collects the ink discharged from the liquid ejecting head 10, and a pump 83 that transfers the ink. Each of the supply flow channel 81 and the collection flow channel 82 may be a flow channel inside a tube, for example. Each of the supply flow channel 81 and the collection flow channel 82 includes a flow channel formed from an opening, a groove, a recess, and the like.

The ink in the liquid container 2 is transferred by the pump 83. The ink flows in the supply flow channel 81, passes through the supply port 42A, and flows into the common liquid chamber RA. A portion of the common liquid chamber RA is formed in the communication plate 24 and another portion of the common liquid chamber RA is formed in the casing 28. The ink in the common liquid chamber RA passes through the relay flow channel 43A, and is supplied to the pressure chamber CA. The ink in the pressure chamber CA passes through the communication flow channel 45A and the communication flow channel 45C, and is ejected from the nozzle N.

The ink not ejected from the nozzle N passes through the communication flow channel 45C and the communication flow channel 45B, and flows into the pressure chamber CB. The ink in the pressure chamber CB passes through the relay flow channel 43B, and is discharged to the common liquid chamber RB. The ink in the common liquid chamber RB flows into the collection flow channel 82 through the discharge port 42B, and is collected by the liquid container 2. In the liquid ejecting head 10, the ink is circulated as described above.

Next, a structure of the liquid ejecting head 10 will be described. The nozzle plate 21 illustrated in FIGS. 1 and 2 is provided with the nozzles N. The nozzles N form a line of nozzles N1. The line of nozzles N1 includes the nozzles N arranged in the y-axis direction. Each nozzle N is a through hole that penetrates the nozzle plate 21 in the z-axis direction.

The compliance substrates 23 are disposed on two sides in the x-axis direction of the nozzle plate 21. Each compliance substrate 23 includes a flexible film. The compliance substrates 23 constitute bottom surfaces of the common liquid chambers RA and RB. The compliance substrates 23 are deformable by receiving a pressure of the ink. The compliance substrates 23 are deformed by the pressure of the ink, so that the compliance substrates 23 can absorb a variation in pressure of the ink in the liquid ejecting head 10.

The communication plate 24 is provided with portions of the common liquid chambers RA and RB, the relay flow channels 43A and 43B, and the communication flow channels 45A to 45C. The communication plate 24 is provided with through holes, grooves or recesses, and so forth. The portions of the common liquid chambers RA and RB, the relay flow channels 43, and the communication flow channels 45 are formed by these through holes, grooves or recesses, and so forth.

The common liquid chambers RA and RB are elongate in the y-axis direction. The common liquid chambers RA and RB correspond to the layout of the nozzles N in the y-axis direction. As illustrated in FIG. 2, upper portions of the common liquid chambers RA and RB are formed in the casing 28 while lower portions of the common liquid chambers RA and RB are formed in the communication plate 24. The lower portions of the common liquid chambers RA and RB formed in the communication plate 24 penetrate the communication plate 24 in the z-axis direction. A portion of the common liquid chamber RA close to the nozzles N is formed to a position overlapping the pressure chamber CA when viewed in the z-axis direction. Likewise, a portion of the common liquid chamber RB close to the nozzles N is formed to a position overlapping the pressure chamber CB when viewed in the z-axis direction.

The relay flow channel 43A establishes communication between the pressure chamber CA and the common liquid chamber RA. The relay flow channel 43A is provided to each of the pressure chambers CA. The relay flow channels 43A are disposed at given intervals in the y-axis direction. The relay flow channel 43B establishes communication between the pressure chamber CB and the common liquid chamber RB. The relay flow channel 43B is provided to each of the pressure chambers CB. The relay flow channels 43B are disposed at given intervals in the y-axis direction.

The communication flow channel 45A communicates with the pressure chamber CA and extends in the z-axis direction. The communication flow channel 45A is provided to each of the pressure chambers CA. The communication flow channel 45B communicates with the pressure chamber CB and extends in the z-axis direction. The communication flow channel 45B is provided to each of the pressure chambers CB.

The communication flow channels 45A and 45B penetrate the communication plate 24 in the z-axis direction. The communication flow channels 45A and 45B are located away from one another in the x-axis direction. Each communication flow channel 45A is disposed at a position overlapping the pressure chamber CA when viewed in the z-axis direction. Each communication flow channel 45B is disposed at a position overlapping the pressure chamber CB when viewed in the z-axis direction. Each communication flow channel 45C extends in the x-axis direction and establishes communication between the communication flow channel 45A and the communication flow channel 45B. The communication flow channel 45C is a groove which is recessed from a bottom surface of the communication plate 24. The communication flow channel 45C communicates with the corresponding nozzle N. The communication flow channels 45A to 45C are disposed at given intervals in the y-axis direction. The nozzle plate 21 is disposed in such a way as to cover the communication flow channels 45A to 45C from below. Each pressure chamber CA and the corresponding pressure chamber CB communicate with each other by using the communication flow channels 45A to 45C.

The pressure chamber substrate 25 is provided with the pressure chambers CA and CB. The pressure chambers CA and CB penetrate the pressure chamber substrate 25 in the z-axis direction. Each of the pressure chambers CA and CB has a predetermined volume. The pressure chambers CA and CB are located away from each other in the x-axis direction. The pressure chambers CA are provided corresponding to the nozzles N, respectively. The pressure chambers CA are disposed at given intervals in the y-axis direction. The pressure chambers CB are provided corresponding to the nozzles N, respectively. The pressure chambers CB are disposed at given intervals in the y-axis direction. As described above, the line of pressure chambers CAL includes the pressure chambers CA. The pressure chamber substrate 25 can be produced from a single-crystalline substrate of silicon, for example. The pressure chamber substrate 25 may be produced from other materials.

Figure 7:
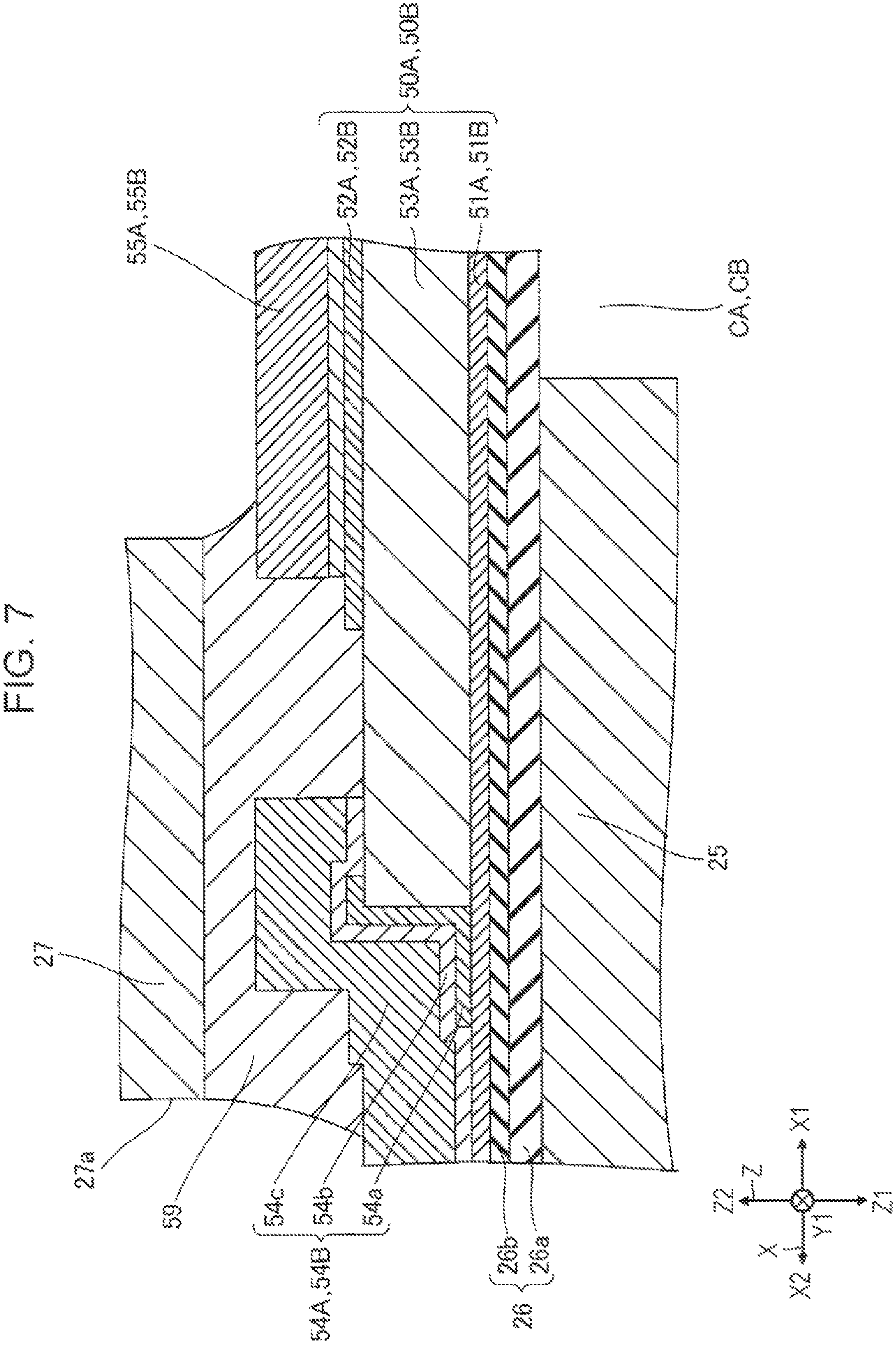
FIG. 7 is a sectional view illustrating a section taken along the VII-VII line in FIG. 6.

FIG. 7 is a sectional view illustrating a section taken along the VII-VII line in FIG. 6. As shown in FIGS. 4 and 7, the vibration plate 26 is disposed at an upper surface of the pressure chamber substrate 25. The vibration plate 26 covers openings of the pressure chamber substrate 25. Of the vibration plate 26, portions covering the openings of the pressure chamber substrate 25 constitute upper wall surfaces of the pressure chambers CA and CB.

As illustrated in FIG. 7, the vibration plate 26 includes an elastic layer 26*a* and an insulating layer 26*b*. The elastic layer 26*a* is made of silicon dioxide ($SiO_2$), for example. The insulating layer 26*b* is made of zirconium dioxide ($ZrO_2$), for example. The elastic layer 26*a* is formed on the pressure chamber substrate 25 and the insulating layer 26*b* is formed on the elastic layer 26*a*.

The piezoelectric elements 50A and 50B are formed on the vibration plate 26. The piezoelectric elements 50A illustrated in FIG. 6 are disposed at positions overlapping the pressure chambers CA when viewed in the z-axis direction. The piezoelectric elements 50B are disposed at positions overlapping the pressure chambers CB when viewed in the z-axis direction. The piezoelectric elements 50A are provided corresponding to the pressure chambers CA, respectively. The piezoelectric elements 50B are provided corresponding to the pressure chambers CB, respectively.

The vibration plate 26 is driven by the piezoelectric elements 50A and 50B and vibrates in the z-axis direction. A portion of the vibration plate 26 constituting the upper wall surface of each pressure chamber CA is driven by the piezoelectric element 50A above the pressure chamber CA. A portion of the vibration plate 26 constituting the upper wall surface of each pressure chamber CB is driven by the piezoelectric element 50B above the pressure chamber CB. A total thickness of the vibration plate 26 is equal to or below 2 μm, for example. The total thickness of the vibration plate 26 may be equal to or below 15 μm, or equal to or below 40 μm, or equal to or below 100 μm. When the total thickness of the vibration plate 26 is equal to or below 15 μm, for example, the vibration plate 26 may include a resin layer. The vibration plate 26 may be formed from a metal. Examples of the metal include stainless steel, nickel, and the like. When the vibration plate 26 is made of the metal, a plate thickness of the vibration plate 26 may be equal to or above 15 μm and equal to or below 100 μm.

As illustrated in FIGS. 4 and 7, each piezoelectric element 50A includes the individual electrode 51A, the common electrode 52A, and a piezoelectric layer 53A. Each piezoelectric element 50B includes an individual electrode 51B, a common electrode 52B, and a piezoelectric layer 53B. Since the piezoelectric elements 50A and 50B have the same structure, the piezoelectric element 50A will be mainly described below. Explanations of the piezoelectric element 50B may be omitted as appropriate.

The individual electrode 51A, the piezoelectric layer 53A, and the common electrode 52A are stacked in this order on the vibration plate 26. The piezoelectric layer 53A is interposed between the individual electrode 51A and the common electrode 52A. The individual electrode 51A is formed into an elongate shape that extends in the x-axis direction. The individual electrodes 51A are arranged in the y-axis direction at intervals in between. The individual electrodes 51A are disposed corresponding to the pressure chambers CA, respectively. As illustrated in FIGS. 5 and 6, the pressure chambers CA are provided with the individual electrodes 51A, respectively. Likewise, the pressure chambers CB are provided with the individual electrodes 51B, respectively. The individual electrodes 51A are disposed at positions overlapping the pressure chambers CA when viewed in the z-axis direction, respectively. The individual electrodes 51B are disposed at positions overlapping the pressure chambers CB when viewed in the z-axis direction, respectively.

Each of the common electrodes 52A and 52B takes on a strip shape and extends in the y-axis direction. The common electrode 52A is continuously provided in such a way as to cover the individual electrodes 51A. The common electrode 52B is continuously provided in such a way as to cover the individual electrodes 51B.

Each of the individual electrodes 51A and 51B includes a foundation layer and an electrode layer. The foundation layer includes titanium (Ti), for example. The electrode layer includes a low-resistance conductive material such as platinum (Pt) and iridium (Ir). The electrode layer may be formed from an oxide such as strontium ruthenate ($SrRuO_3$) and lanthanum nickel oxide ($LaNiO_3$). Each of the piezoelectric layers 53A and 53B is formed from a publicly known piezoelectric material such as lead zirconate titanate ($Pb(Zr,Ti)O_3$) and ceramics.

Each of the common electrodes 52A and the 52B includes a foundation layer and an electrode layer. The foundation layer includes titanium, for example. The electrode layer includes a low-resistance conductive material such as platinum and Iridium. The electrode layer may be formed from an oxide such as strontium ruthenate and lanthanum nickel oxide. A region of the piezoelectric layer 53A located between the individual electrode 51A and the common electrode 52A serves as a driving region. A region of the piezoelectric layer 53B located between the individual electrode 51B and the common electrode 52B serves as a driving region. The driving regions are formed on the pressure chambers CA and CB, respectively.

A prescribed reference voltage is applied to the common electrodes 52A and 52B. The reference voltage is a constant voltage which is set to a voltage higher than a ground voltage, for example. A retention signal at a constant voltage is applied to the common electrodes 52A and 52B, for example. Driving signals at variable voltages are applied to the individual electrodes 51A and 51B. A voltage corresponding to a difference between the reference voltage to be applied to the common electrode 52A and the driving signal to be applied to the individual electrode 51A is applied to the piezoelectric layer 53A. Likewise, a voltage corresponding to a difference between the reference voltage to be applied to the common electrode 52B and the driving signal to be applied to the individual electrode 51B is applied to the piezoelectric layer 53B. The driving signal corresponds to an amount of ejection of the liquid to be ejected from the nozzle N.

As a consequence of deformation of the piezoelectric layer 53A along with the application of the voltage between the individual electrode 51A and the common electrode 52A, the piezoelectric element 50A creates energy for flexurally deforming the vibration plate 26. Likewise, as a consequence of deformation of the piezoelectric layer 53B along with the application of the voltage between the individual electrode 51B and the common electrode 52B, the piezoelectric element 50B creates energy for flexurally deforming the vibration plate 26.

The vibration of the vibration plate 26 with the energy generated by the piezoelectric element 50A changes the pressure of the liquid in the pressure chamber CA, whereby the liquid in the pressure chamber CA is ejected from the nozzle N. The vibration of the vibration plate 26 with the energy generated by the piezoelectric element 50B changes the pressure of the liquid in the pressure chamber CB, whereby the liquid in the pressure chamber CB is ejected from the nozzle N.

The sealing plate 27 is formed into a rectangular shape when viewed in the z-axis direction. The sealing plate 27 protects the piezoelectric elements 50A and 50B and reinforces mechanical strengths of the pressure chamber substrate 25 and the vibration plate 26. The sealing plate 27 is attached to the vibration plate 26 by using an adhesive, for example. The sealing plate 27 is fixed to the pressure chamber substrate 25 through the vibration plate 26.

As illustrated in FIGS. 1 and 2, the COF 60 includes a flexible wiring board 61 and a driving circuit 62. The flexible wiring board 61 is a wiring board having flexibility. The flexible wiring board 61 is an FPC, for example. The flexible wiring board 61 may be an FFC, for instance. The FPC stands for flexible printed circuit. The FFC stands for flexible flat cable.

As illustrated in FIG. 2, the flexible wiring board 61 is electrically coupled to the individual electrodes 51A and 51B of the piezoelectric elements 50A and 50B through COM lines 54A and 54B to be described later. In the meantime, the flexible wiring board 61 is electrically coupled to the common electrodes 52A and 52B of the piezoelectric elements 50A and 50B through VBS lines 55A and 55B to be described later. The flexible wiring board 61 is electrically coupled to a not-illustrated circuit board. The circuit board includes a driving signal generation circuit 32 illustrated in FIG. 19.

The driving circuit 62 is mounted on the flexible wiring board 61. The driving circuit 62 includes a switching element for driving the piezoelectric elements 50. The driving circuit 62 is electrically coupled to a control unit 30 illustrated in FIG. 19 through the flexible wiring board 61 and the circuit board. The driving circuit 62 receives a driving signal Com outputted from the driving signal generation circuit 32. The switching element of the driving circuit 62 switches whether or not to supply the driving signal Com generated by the driving signal generation circuit 32 to the piezoelectric elements 50A and 50B. The driving circuit 62 causes the vibration plate 26 to vibrate by supplying a driving voltage or a current to the piezoelectric elements 50A and 50B.

As illustrated in FIGS. 6 and 7, the liquid ejecting head 10 includes the COM lines 54A and 54B. The COM lines 54A are electrically coupled to the piezoelectric elements 50A. The COM lines 54B are electrically coupled to the piezoelectric elements 50B. The COM lines 54A are coupled to the individual electrodes 51A, respectively. The COM lines 54B are coupled to the individual electrodes 51B, respectively. The individual electrodes 51A are disposed in a region where the line of pressure chambers CAL is formed when viewed in the z-axis direction. The individual electrodes 51B are disposed in a region where the line of pressure chambers CBL is formed when viewed in the z-axis direction. Since the COM lines 54A and 54B have the same structure, the COM lines 54A will be mainly described below and explanations of the COM lines 54B may be omitted as appropriate.

The COM lines 54A and 54B extend in the x-axis direction and are drawn into an opening 27*a* in the sealing plate 27. The opening 27*a* is illustrated in FIGS. 1 and 2. Illustration of the COM lines 54A and 54B is omitted in FIG. 1. The opening 27*a* penetrates the sealing plate 27 in the z-axis direction. The COM lines 54A and 54B are electrically coupled to the COF 60 at a position corresponding to the opening 27*a* when viewed in the z-axis direction. The COM lines 54A and 54B are made of a conductive material having lower resistance than that of the individual electrodes 51A and 51B. For example, the COM lines 54A and 54B are conductive patterns having a structure of laminating a gold (Au) conductive film on a surface of a conductive film made of nichrome (NiCr).

Each of the COM lines 54A and 54B includes an electrode layer 54*a*, a first close contact layer 54*b*, and a first wiring layer 54*c*. The electrode layer 54*a* covers an end surface in the x2 direction of the piezoelectric layer 53A. The end surface in the x2 direction forms a surface intersecting with the x-axis direction. The first close contact layer 54*b* covers the electrode layer 54*a* and the individual electrode 51. The first close contact layer 54*b* comes into close contact with the electrode layer 54*a* and the individual electrode 51. The first wiring layer 54*c* covers the first close contact layer 54*b*. The first wiring layer 54*c* is electrically coupled to the individual electrode 51 through the first close contact layer 54*b*.

Figure 8:
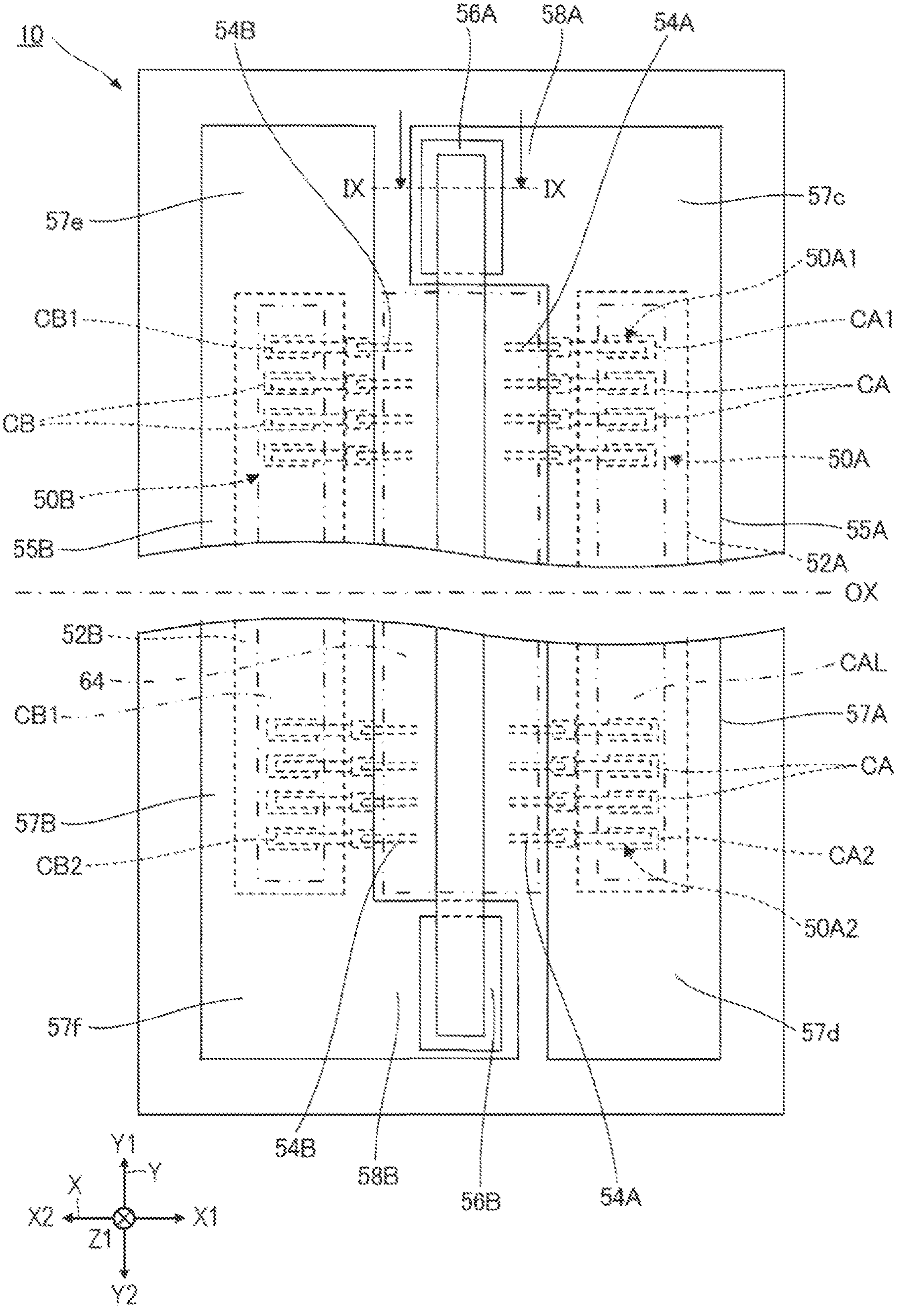
FIG. 8 is an enlarged plan view illustrating a principal part of the liquid ejecting head according to the Embodiment 1.

FIG. 8 is an enlarged plan view illustrating a principal part of the liquid ejecting head 10 according to the Embodiment 1. The COM lines 54A and 54B are electrically coupled to the flexible wiring board 61 through a COF mounting portion 64 illustrated in FIGS. 3 and 8. The COF mounting portion 64 includes a conductive layer that electrically couples the first wiring layer 54*c* to a wiring portion of the flexible wiring board 61. Each individual electrode 51A is electrically coupled to the driving circuit 62 through the COM line 54A, the COF mounting portion 64, and the flexible wiring board 61. Each individual electrode 51B is electrically coupled to the driving circuit 62 through the COM line 54B, the COF mounting portion 64, and the flexible wiring board 61.

As illustrated in FIGS. 3 and 8, the liquid ejecting head 10 includes the VBS lines 55A and 55B as well as VBS line mounting portions 56A and 56B. The VBS line 55A is electrically coupled to the common electrode 52A. The VBS line 55B is electrically coupled to the common electrode 52B. The VBS line 55A is electrically coupled to the COF 60 through the VBS line mounting portion 56A. The VBS line 55B is electrically coupled to the COF 60 through the VBS line mounting portion 56B. The VBS line 55A represents an example of a “first common line”. The VBS line 55B represents an example of a “second common line”.

As illustrated in FIG. 7, the VBS line 55A is located away from the COM line 54A in the x-axis direction. An insulative adhesive 59 is provided between the VBS line 55A and the COM line 54A. The sealing plate 27 is attached to the VBS lines 55A and 55B, the piezoelectric layers 53A and 53B, the COM lines 54A, and the like by using the adhesive 59.

As illustrated in FIG. 8, the VBS line 55A includes a first portion 57A that extends in the y-axis direction, and a second portion 58A that protrudes in the x-axis direction from a first end portion 57*c* of the first portion 57A. The first portion 57A is provided in such a way as to cover the line of pressure chambers CAL when viewed in the z-axis direction. The first portion 57A extends to outside of the line of pressure chambers CAL in the y-axis direction. A length of the first portion 57A is longer than a length of the line of pressure chambers CAL in the y-axis direction.

The first portion 57A includes the first end portion 57*c* and a second end portion 57*d*. The first end portion 57*c* is an end portion in the y1 direction and the second end portion 57*d* is an end portion in the y2 direction. The first end portion 57*c* is located in the y1 direction relative to the line of pressure chambers CAL. The second end portion 57*d* is located in the y2 direction relative to the line of pressure chambers CAL. The common electrode 52A is formed below the first portion 57A in the z-axis direction. The VBS line 55A is disposed in such a way as to cover the common electrode 52A in the y-axis direction. The VBS line 55A is longer than the common electrode 52A in the y-axis direction. The VBS line 55A may be shorter than the common electrode 52A in the y-axis direction.

The second portion 58A extends in the x2 direction from the first end portion 57*c* of the first portion 57A. The second portion 58A is located in the y1 direction relative to the COF mounting portion 64 when viewed in the z-axis direction. The VBS line 55A is not electrically coupled to the COF mounting portion 64.

Figure 9:
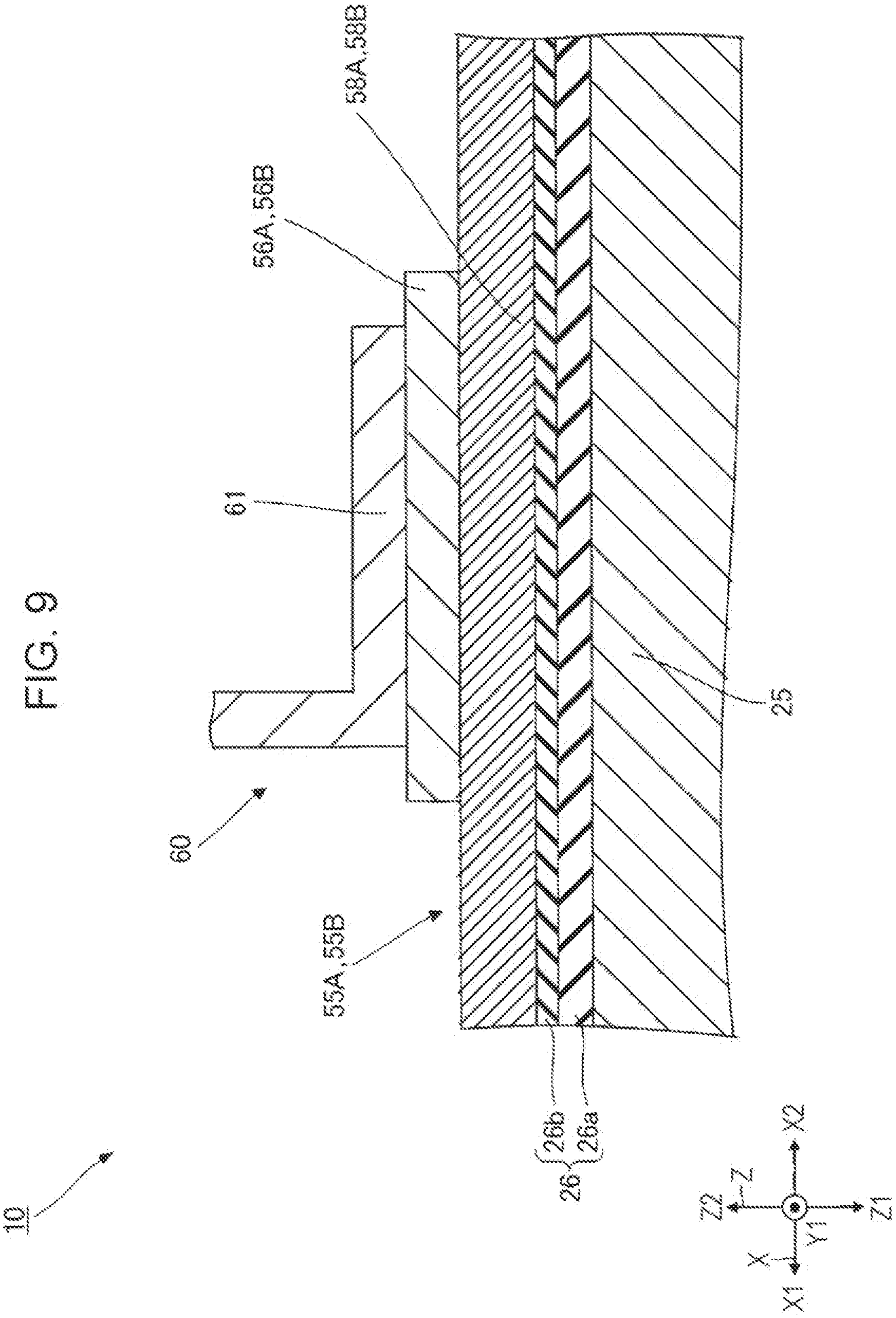
FIG. 9 is a sectional view illustrating a section taken along the IX-IX line in FIG. 8.

FIG. 9 is a sectional view illustrating a section taken along the IX-IX line in FIG. 8. FIG. 9 is a sectional view illustrating the second portion 58A of the VBS line 55A, the VBS line mounting portion 56A, and the COF 60. As illustrated in FIGS. 8 and 9, the VBS line mounting portion 56A is formed on the second portion 58A of the VBS line 55A. The VBS line mounting portion 56A includes a conductive layer. The flexible wiring board 61 is electrically coupled to the VBS line mounting portion 56A.

As illustrated in FIG. 8, the VBS line 55B includes a first portion 57B that extends in the y-axis direction, and a second portion 58B that protrudes in the x-axis direction from a second end portion 57*f* of the first portion 57B. The first portion 57B is provided in such a way as to cover the line of pressure chambers CBL when viewed in the z-axis direction. The first portion 57B extends to outside of the line of pressure chambers CBL in the y-axis direction. A length of the first portion 57B is longer than a length of the line of pressure chambers CBL in the y-axis direction.

The first portion 57B includes a first end portion 57*e* and the second end portion 57*f*. The first end portion 57*e* is an end portion in the y1 direction and the second end portion 57*f* is an end portion in the y2 direction. The first end portion 57*e* is located in the y1 direction relative to the line of pressure chambers CBL. The second end portion 57*f* is located in the y2 direction relative to the line of pressure chambers CBL. The common electrode 52B is formed below the first portion 57B in the z-axis direction. The VBS line 55B is disposed in such a way as to cover the common electrode 52B in the y-axis direction. The VBS line 55B is longer than the common electrode 52B in the y-axis direction. The VBS line 55B may be shorter than the common electrode 52B in the y-axis direction.

The second portion 58B extends in the x1 direction from the second end portion 57*f* of the first portion 57B. The second portion 58B is disposed in the y2 direction relative to the COF mounting portion 64 when viewed in the z-axis direction. The VBS line 55B is not electrically coupled to the COF mounting portion 64.

As illustrated in FIG. 8, the VBS line mounting portion 56B is formed on the second portion 58B of the VBS line 55B. The VBS line mounting portion 56B includes a conductive layer. The flexible wiring board 61 is electrically coupled to the VBS line mounting portion 56B.

According to the above-described liquid ejecting head 10, the VBS line 55A electrically coupled to the common electrode 52A of the line of pressure chambers CAL is electrically coupled to the COF 60 through the VBS line mounting portion 56A. The VBS line 55B electrically coupled to the common electrode 52B of the line of pressure chambers CBL is electrically coupled to the COF 60 through the VBS line mounting portion 56B. The VBS line mounting portion 56A is disposed in the y1 direction relative to the lines of pressure chambers CAL and CBL in the y-axis direction, and the VBS line mounting portion 56B is disposed in the y2 direction relative to the lines of pressure chambers CAL and CBL in the y-axis direction.

In the liquid ejecting head 10, the VBS line mounting portions 56A and 56B are disposed on mutually opposite sides in the y-axis direction. Of the piezoelectric elements 50A corresponding to the line of pressure chambers CAL, the voltage to be supplied to the common electrode 52A of a piezoelectric element 50A1 located closest to the VBS line mounting portion 56A is the highest while the voltage to be supplied to the common electrode 52A of a piezoelectric element 50A2 located farthest from the VBS line mounting portion 56A is the lowest. This phenomenon is attributed to an effect of a voltage drop due to electric resistance of the VBS line 55A. The piezoelectric element 50A1 and the piezoelectric element 50A2 are included in the piezoelectric elements 50A.

Of the piezoelectric elements 50B corresponding to the line of pressure chambers CBL, the voltage to be supplied to the common electrode 52B of a piezoelectric element 50B2 located closest to the VBS line mounting portion 56B is the highest while the voltage to be supplied to the common electrode 52B of a piezoelectric element 50B1 located farthest from the VBS line mounting portion 56B is the lowest. This phenomenon is attributed to an effect of a voltage drop due to electric resistance of the VBS line 55B. The piezoelectric element 50B1 and the piezoelectric element 50B2 are included in the piezoelectric elements 50B.

A pressure chamber CA1 out of the pressure chambers CA which is located at the farthest end in the y1 direction and a pressure chamber CB1 out of the pressure chambers CB which is located at the farthest end in the y1 direction communicate with a common nozzle N. The liquids in the pressure chambers CA1 and CB1 are ejected from the same nozzle N.

A pressure chamber CA2 out of the pressure chambers CA which is located at the farthest end in the y2 direction and a pressure chamber CB2 out of the pressure chambers CB which is located at the farthest end in the y2 direction communicate with a common nozzle N. The liquids in the pressure chambers CA2 and CB2 are ejected from the same nozzle N. The liquids in the pressure chambers CA and CB which is present at the same position in the Y-axis direction are ejected from the same nozzle N.

Problem of Related Art

Next, a problem of the related art will be discussed. In the related art, the VBS line mounting portions are disposed at two end portions in the y-axis direction. In the related art, the voltage is supplied to the VBS lines coupled to the piezoelectric elements 50A of the line of pressure chambers CAL and the VBS lines coupled to the piezoelectric elements 50B of the line of pressure chambers CBL through the common VBS line mounting portion. As a consequence, the voltage supplied to the piezoelectric element 50 on an outer side in the y-axis direction being close to the VBS line mounting portion is higher and the voltage supplied to the piezoelectric element 50 at a central part being far from the VBS line mounting portion is lower.

The above-described related art is cumulatively affected by the voltage drops, thereby causing a problem of a large variation between ejection of the liquid from the nozzle N communicating with the pressure chambers CA and CB located on the outer side in the y-axis direction being close to the VBS line mounting portion and ejection of the liquid from the nozzle N communicating with the pressure chambers CA and CB located at the central part being far from the VBS line mounting portion.

Effects of Embodiment 1

As described above, in the liquid ejecting head 10 according to the Embodiment 1, the VBS line mounting portion 56A on the line A side and the VBS line mounting portion 56B on the line B side are disposed on mutually opposite sides in the y-axis direction. The voltage is supplied in mutually opposite directions to the VBS line 55A on the line A side and to the VBS line 55B on the line B side. For example, to the pressure chamber CA1 disposed at the end in the y1 direction, the voltage is supplied from the VBS line mounting portion 56A on the close side through the VBS line 55A. To the pressure chamber CB1 disposed at the end in the y1 direction, the voltage is supplied from the VBS line mounting portion 56B on the far side through the VBS line 55B. In this case, the voltage drop by the VBS line 55A is smaller than the voltage drop by the VBS line 55B. The effects of the voltage drops based on distances from the VBS line mounting portions 56A and 56B are cancelled between the piezoelectric element 50A on the line A side and the piezoelectric element 50B on the line B side. Accordingly, the variation in ejection of the liquid between the nozzles N is suppressed. As a consequence, reliability of the liquid ejecting head 10 is improved.

Embodiment 2

Figure 10:
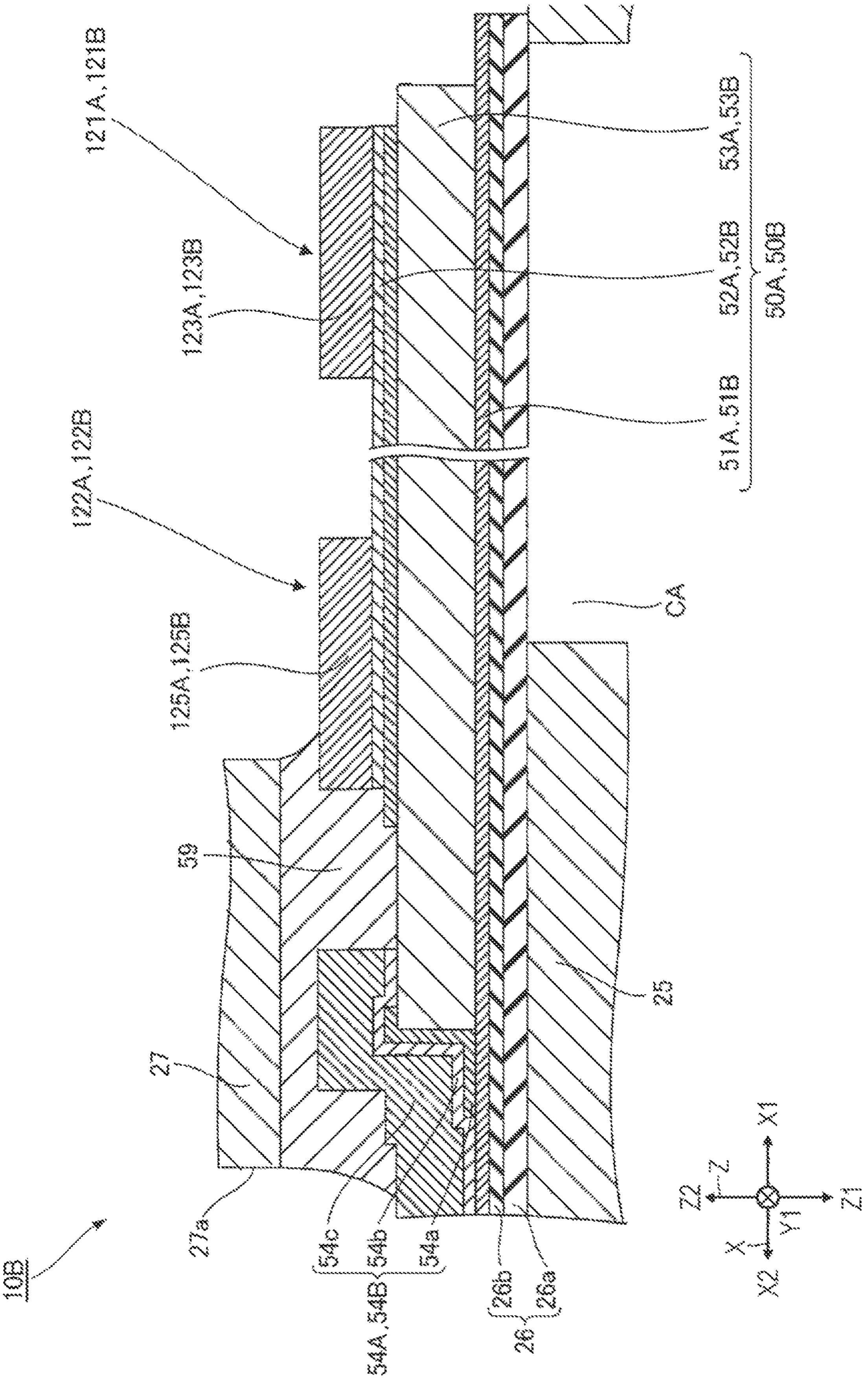
FIG. 10 is a sectional view illustrating part of a liquid ejecting head according to Embodiment 2.
Figure 11:
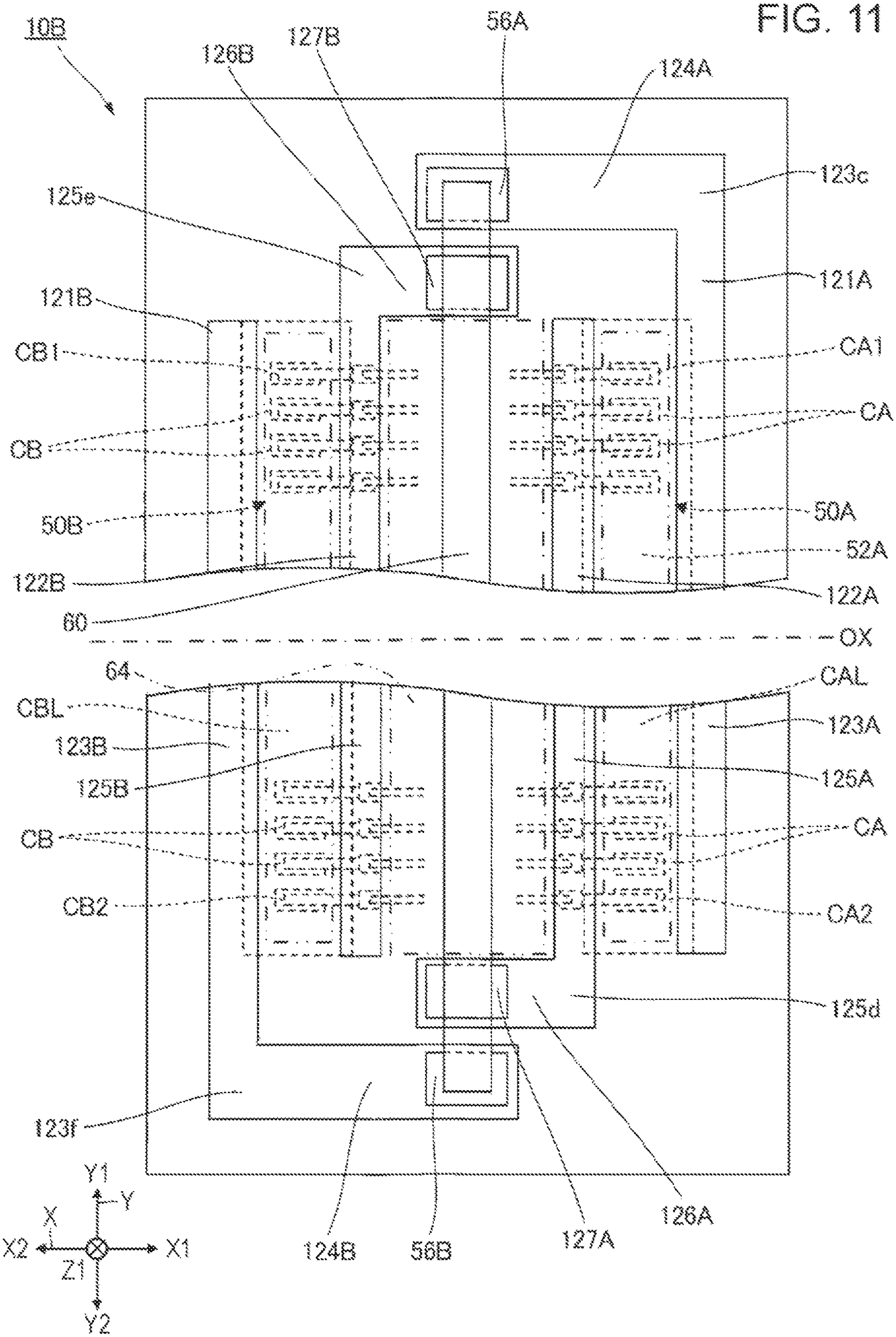
FIG. 11 is an enlarged plan view illustrating a principal part of the liquid ejecting head according to the Embodiment 2.

Next, a liquid ejecting head 10B according to Embodiment 2 will be described with reference to FIGS. 10 and 11. FIG. 10 is a sectional view illustrating part of the liquid ejecting head 10B according to the Embodiment 2. FIG. 11 is an enlarged plan view illustrating a principal part of the liquid ejecting head 10B according to the Embodiment 2. The liquid ejecting head 10B according to the Embodiment 2 is different from the liquid ejecting head 10 according to the Embodiment 1 in that the liquid ejecting head 10B includes VBS lines 121A and 122A instead of the VBS line 55A on the line A side, includes VBS lines 121B and 122B instead of the VBS line 55B on the line B side, includes VBS line mounting portions 56A and 127A as the VBS line mounting portions on the line A side, and includes VBS line mounting portions 56B and 127B as the VBS line mounting portions on the line B side. In the description of the Embodiment 2, explanations of the same features as those in the Embodiment 1 may be omitted as appropriate. The VBS line 121A represents an example of the "first common line". The VBS line 121B represents an example of the "second common line". The VBS line 122A represents an example of a "third common line". The VBS line 122B represents an example of a "fourth common line".

As illustrated in FIG. 11, the liquid ejecting head 10B includes the VBS lines 121A and 122A on the line A side, and the VBS lines 121B and 122B on the line B side. The VBS lines 121A and 122A are electrically coupled to the common electrode 52A on the line A side. The VBS lines 121B and 122B are electrically coupled to the common electrode 52B on the line B side.

The VBS line 121A includes a first portion 123A that extends in the y-axis direction, and a second portion 124A that protrudes in the x-axis direction from an end portion 123*c* of the first portion 123A. The VBS line 122A includes a first portion 125A that extends in the y-axis direction, and a second portion 126A that protrudes in the x-axis direction from an end portion 125*d* of the first portion 125A. The end portion 123*c* is an end portion located close to the pressure chamber CA1 in the y-axis direction and the end portion 125*d* is an end portion located close to the pressure chamber CA2 in the y-axis direction.

The first portion 123A of the VBS line 121A and the first portion 125A of the VBS line 122A are located away from each other in the x-axis direction. The first portion 123A is disposed at a position farther in the x-axis direction from the COF 60 than from the first portion 125A. In other words, the first portion 125A is disposed at a position closer in the x-axis direction to the line of pressure chambers CBL than to the first portion 123A. A close side to the COF 60 in the x-axis direction may be described as an "inner side" while a far side from the COF 60 may be described as an "outer side" as appropriate. The VBS line 121A may be described as the "VBS line 121A on the outer side" while the VBS line 122A may be described as the "VBS line 122A on the inner side" as appropriate.

As illustrated in FIG. 10, the first portion 125A of the VBS line 122A on the inner side is electrically coupled to the common electrode 52A at a position closer in the x-axis direction to the COF 60 than to the first portion 123A of the VBS line 121A on the outer side.

The VBS line 121B includes a first portion 123B that extends in the y-axis direction, and a second portion 124B that protrudes in the x-axis direction from an end portion 123*f* of the first portion 123B. The VBS line 122B includes a first portion 125B that extends in the y-axis direction, and a second portion 126B that protrudes in the x-axis direction from an end portion 125*e* of the first portion 125B. The end portion 123*f* is an end portion located close to the pressure chamber CB2 in the y-axis direction and the end portion 125*e* is an end portion located close to the pressure chamber CB1 in the y-axis direction.

The first portion 123B of the VBS line 121B and the first portion 125B of the VBS line 122B are located away from each other in the x-axis direction. The first portion 123B is disposed at a position farther in the x-axis direction from the COF 60 than from the first portion 125B. In other words, the first portion 125B is disposed at a position closer in the x-axis direction to the line of pressure chambers CAL than to the first portion 123B. The VBS line 121B may be described as the "VBS line 121B on the outer side" while the VBS line 122B may be described as the "VBS line 122B on the inner side" as appropriate.

As illustrated in FIG. 10, the first portion 125B of the VBS line 122B on the inner side is electrically coupled to the common electrode 52B at a position closer in the x-axis direction to the COF 60 than to the first portion 123B of the VBS line 121B on the outer side.

As illustrated in FIG. 11, the liquid ejecting head 10B includes the VBS line mounting portions 56A and 127A on the line A side, and the VBS line mounting portions 56B and 127B on the line B side. The VBS line mounting portion 56A is disposed in the y1 direction relative to the line of pressure chambers CAL on the line A side. The VBS line mounting portion 56A is electrically coupled to the VBS line 121A on the outer side. The VBS line mounting portion 56A is provided at the second portion 124A. The VBS line mounting portion 127A is disposed in the y2 direction relative to the line of pressure chambers CAL on the line A side. The VBS line mounting portion 127A is electrically coupled to the VBS line 122A on the inner side. The VBS line mounting portion 127A is provided at the second portion 126A.

The VBS line mounting portion 56B is disposed in the y2 direction relative to the line of pressure chambers CBL on the line B side. The VBS line mounting portion 56B is electrically coupled to the VBS line 121B on the outer side. The VBS line mounting portion 56B is provided at the second portion 124B. The VBS line mounting portion 127B is disposed in the y1 direction relative to the line of pressure chambers CBL on the line B side. The VBS line mounting portion 127B is electrically coupled to the VBS line 122B on the inner side. The VBS line mounting portion 127B is provided at the second portion 126B.

In the liquid ejecting head 10B according to the Embodiment 2, the VBS lines 121A and 122A are electrically coupled to the common electrode 52A on the line A side. The VBS line 121A is electrically coupled to the COF 60 on one side while the VBS line 122A is electrically coupled to the COF 60 on another side. The voltage is supplied to the common electrode 52A through the VBS line mounting portions 56A and 127A which are disposed on mutually opposite sides in the y-axis direction. In the liquid ejecting head 10B, the VBS lines 121B and 122B are electrically coupled to the common electrode 52B on the line B side. The VBS line 121B is electrically coupled to the COF 60 on one side while the VBS line 122B is electrically coupled to the COF 60 on another side. The voltage is supplied to the common electrode 52B through the VBS line mounting portions 56B and 127B which are disposed on mutually opposite sides in the y-axis direction. Accordingly, the effects of the voltage drops on the common electrodes 52A and 52B are relaxed. Thus, the variation in ejection of the liquid between the nozzles N arranged in the y-axis direction is suppressed.

Embodiment 3

Figure 12:
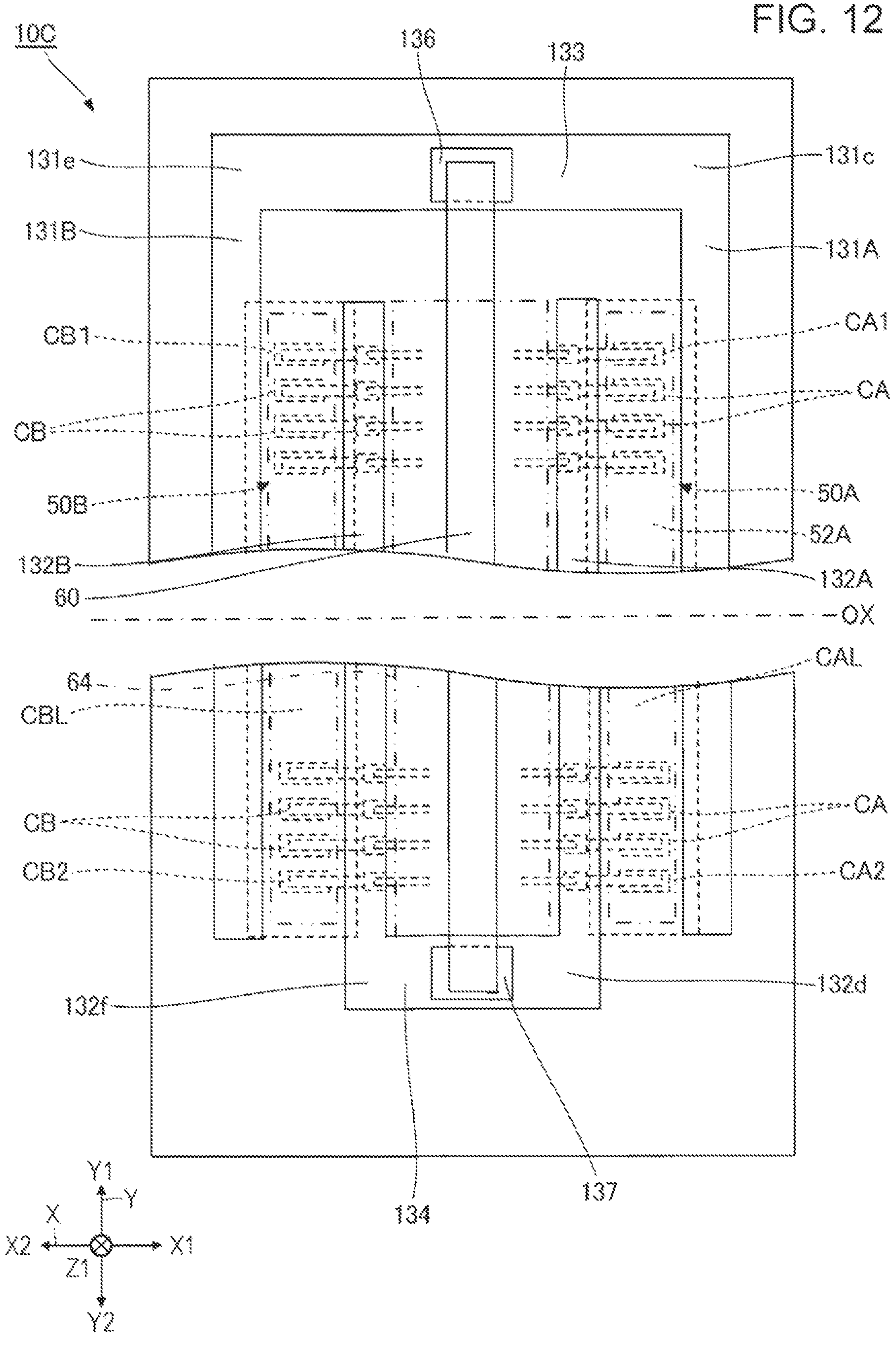
FIG. 12 is an enlarged plan view illustrating a principal part of a liquid ejecting head according to Embodiment 3.

Next, a liquid ejecting head 10C according to Embodiment 3 will be described with reference to FIG. 12. FIG. 12 is an enlarged plan view illustrating a principal part of the liquid ejecting head according to the Embodiment 3. The liquid ejecting head 10C according to the Embodiment 3 is different from the liquid ejecting head 10 according to the Embodiment 1 in that the liquid ejecting head 10C includes VBS lines 131A and 132A instead of the VBS line 55A on the line A side, includes VBS lines 131B and 132B instead of the VBS line 55B on the line B side, includes a joining portion 133 that joins the VBS line 131A to the VBS line 131B, includes a joining portion 134 that joins the VBS line 132A to the VBS line 132B, includes a VBS line mounting portion 136 provided to the joining portion 133, and includes a VBS line mounting portion 137 provided to the joining portion 134. In the description of the Embodiment 3, the same explanations as those in the Embodiments 1 and 2 may be omitted as appropriate. The VBS line 131A represents an example of the "first common line". The VBS line 132B represents an example of the "second common line". The VBS line 132A represents an example of the "third common line". The VBS line 131B represents an example of the "fourth common line".

The liquid ejecting head 10C includes the VBS lines 131A and 132A on the line A side, and the VBS lines 131B and 132B on the line B side. The VBS lines 131A and 132A are electrically coupled to the common electrode 52A on the line A side. The VBS lines 131B and 132B are electrically coupled to the common electrode 52B on the line B side.

The VBS lines 131A and 132A extend in the y-axis direction and are located away from each other in the x-axis direction. The VBS line 132A is disposed at a position closer in the x-axis direction to the COF 60 than to the VBS line 131A. The VBS line 131A protrudes in the y1 direction relative to the line of pressure chambers CAL. An end portion 131*c* of the VBS line 131A is located in the y1 direction relative to the line of pressure chambers CAL. The VBS line 132A protrudes in the y2 direction relative to the line of pressure chambers CAL. An end portion 132*d* of the VBS line 132A is located in the y2 direction relative to the line of pressure chambers CAL.

The VBS lines 131B and 132B extend in the y-axis direction and are located away from each other in the x-axis direction. The VBS line 132B is disposed at a position closer in the x-axis direction to the COF 60 than to the VBS line 131B. The VBS line 131B protrudes in the y1 direction relative to the line of pressure chambers CBL. An end portion 131*e* of the VBS line 131B is located in the y1 direction relative to the line of pressure chambers CBL. The VBS line 132B protrudes in the y2 direction relative to the line of pressure chambers CBL. An end portion 132*f* of the VBS line 132B is located in the y2 direction relative to the line of pressure chambers CBL.

As described above, the liquid ejecting head 10C includes the joining portions 133 and 134, and the VBS line mounting portions 136 and 137. The joining portion 133 extends in the x-axis direction and joins the end portions 131*c* and 131*e* of the VBS lines 131A and 131B to each other. The joining portion 133 joins the VBS lines 131A and 131B on the outer side in the x-axis direction to each other. The joining portion 133 is located in the y1 direction relative to the lines of pressure chambers CAL and CBL. The joining portion 133 is provided with the VBS line mounting portion 136. The VBS lines 131A and 131B are electrically coupled to the COF 60 through the VBS line mounting portion 136 and the joining portion 133. The VBS lines 131A and 131B are electrically coupled to the COF 60 at a position on one side relative to the lines of pressure chambers CAL and CBL. The "position on one side" includes a position shifted in the y1 direction from the center line OX in the y-axis direction. A "position on another side" to be described later includes a position shifted in the y2 direction from the center line OX in the y-axis direction.

The joining portion 134 extends in the x-axis direction and joins the end portions 132*d* and 132*f* of the VBS lines 132A and 132B to each other. The joining portion 134 is located in the y2 direction relative to the lines of pressure chambers CAL and CBL. The joining portion 134 is provided with the VBS line mounting portion 137. The VBS lines 132A and 132B are electrically coupled to the COF 60 through the VBS line mounting portion 137 and the joining portion 134. The VBS lines 132A and 132B are electrically coupled to the COF 60 at a position on another side relative to the lines of pressure chambers CAL and CBL.

The liquid ejecting head 10C according to the above-described Embodiment 3 also takes into account the effects of the voltage drops due to the VBS lines 131A, 131B, 132A and 132B in the y-axis direction. According to the above-described liquid ejecting head 10C, the variation in ejection of the liquid among the nozzles N arranged in the y-axis direction is suppressed.

Embodiment 4

Figure 13:
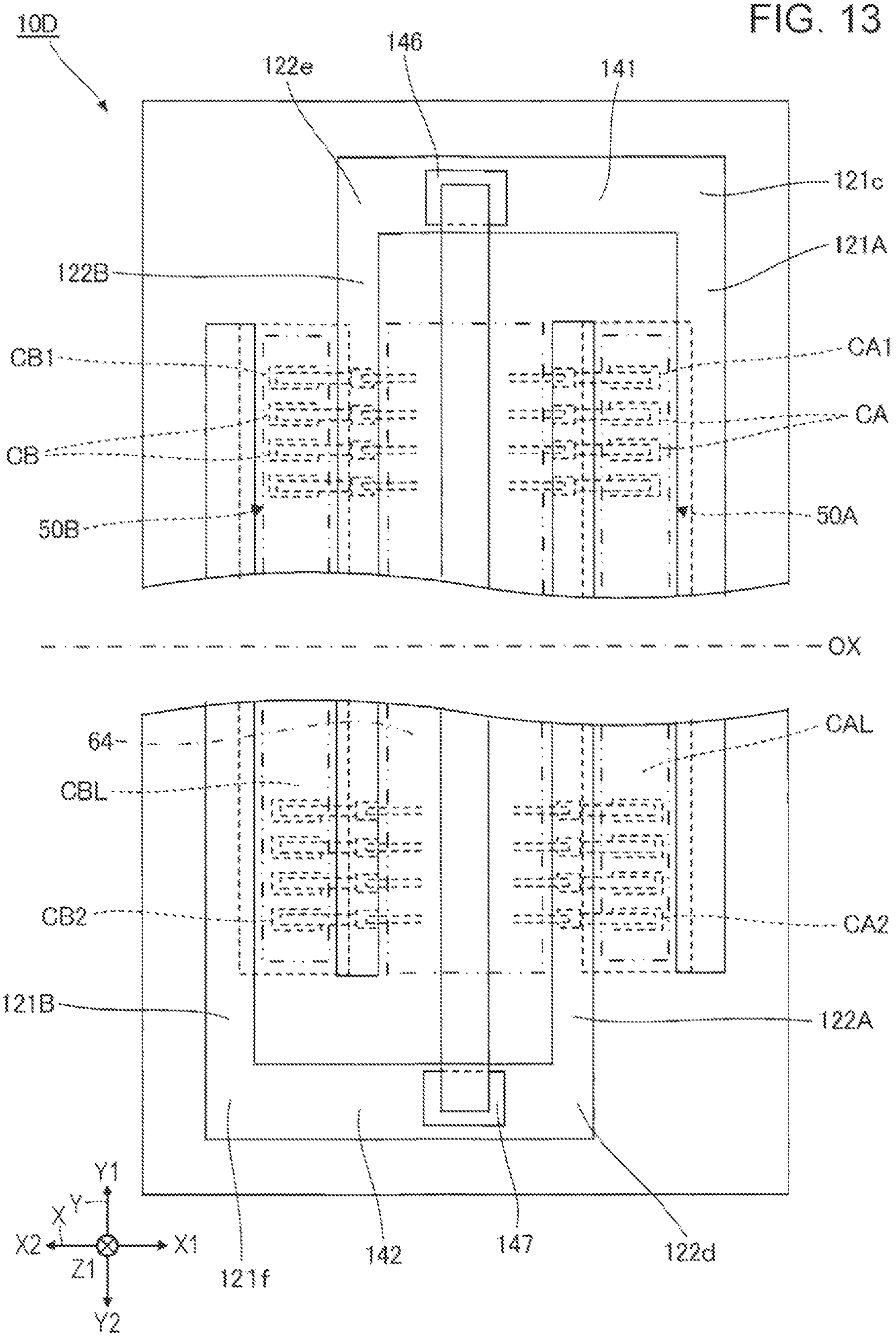
FIG. 13 is an enlarged plan view illustrating a principal part of a liquid ejecting head according to Embodiment 4.

Next, a liquid ejecting head 10D according to Embodiment 4 will be described with reference to FIG. 13. FIG. 13 is an enlarged plan view illustrating a principal part of the liquid ejecting head according to the Embodiment 4. The liquid ejecting head 10D according to the Embodiment 4 is different from the liquid ejecting head 10B according to the Embodiment 2 in that the liquid ejecting head 10D includes a joining portion 141 that joins the VBS line 121A to the VBS line 122B, includes a joining portion 142 that joins the VBS line 121B to the VBS line 122A, includes a VBS line mounting portion 146 provided to the joining portion 141, and includes a VBS line mounting portion 147 provided to the joining portion 142. In the description of the Embodiment 4, the same explanations as those in the Embodiments 1 to 3 may be omitted as appropriate.

The liquid ejecting head 10D includes the VBS lines 121A and 122A on the line A side, and the VBS lines 121B and 122B on the line B side. The VBS lines 121A and 122A are electrically coupled to the common electrode 52A on the line A side. The VBS lines 121B and 122B are electrically coupled to the common electrode 52B on the line B side.

The liquid ejecting head 10D includes the joining portions 141 and 142, and the VBS line mounting portions 146 and 147. The joining portion 141 extends in the x-axis direction and joins end portions 121*c* and 122*e* of the VBS lines 121A and 122B to each other. The end portion 121*c* of the VBS line 121A is located in the y1 direction relative to the line of pressure chambers CAL. The end portion 122*e* of the VBS line 122B is located in the y1 direction relative to the line of pressure chambers CBL. The joining portion 141 joins the VBS line 121A on the outer side and on the line A side to the VBS line 122B on the inner side and on the line B side. The joining portion 141 is located in the y1 direction relative to the lines of pressure chambers CAL and CBL. The joining portion 141 is provided with the VBS line mounting portion 146. The VBS lines 121A and 122B are electrically coupled to the COF 60 through the VBS line mounting portion 146 and the joining portion 141. The VBS lines 121A and 122B are electrically coupled to the COF 60 at a position on one side relative to the lines of pressure chambers CAL and CBL.

The joining portion 142 extends in the x-axis direction and joins end portions 122*d* and 121*f* of the VBS lines 122A and 121B to each other. The end portion 122*d* of the VBS line 122A is located in the y2 direction relative to the line of pressure chambers CAL. The end portion 121*f* of the VBS line 121B is located in the y2 direction relative to the line of pressure chambers CBL. The joining portion 142 joins the VBS line 122A on the inner side and on the line A side to the VBS line 121B on the outer side and on the line B side. The joining portion 142 is located in the y2 direction relative to the lines of pressure chambers CAL and CBL. The joining portion 142 is provided with the VBS line mounting portion 147. The VBS lines 122A and 121B are electrically coupled to the COF 60 through the VBS line mounting portion 147 and the joining portion 142. The VBS lines 122A and 121B are electrically coupled to the COF 60 at a position on another side relative to the lines of pressure chambers CAL and CBL.

The liquid ejecting head 10D according to the above-described Embodiment 4 also takes into account the effects of the voltage drops due to the VBS lines 121A, 121B, 122A and 122B in the y-axis direction. According to the above-described liquid ejecting head 10D, the variation in ejection of the liquid among the nozzles N arranged in the y-axis direction is suppressed.

Embodiment 5

Figure 14:
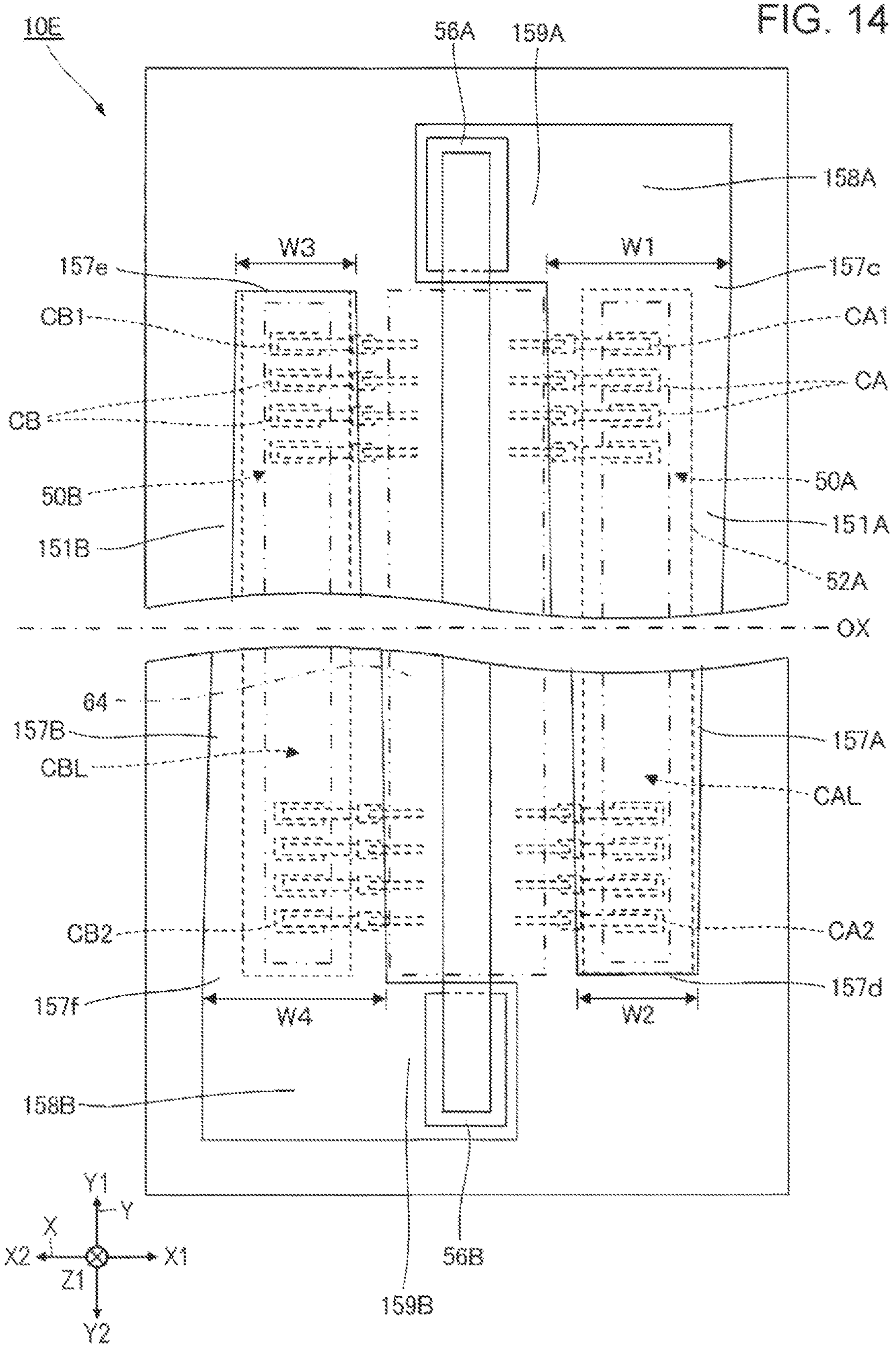
FIG. 14 is an enlarged plan view illustrating a principal part of a liquid ejecting head according to Embodiment 5.

Next, a liquid ejecting head 10E according to Embodiment 5 will be described with reference to FIG. 14. FIG. 14 is an enlarged plan view illustrating a principal part of the liquid ejecting head according to the Embodiment 5. The liquid ejecting head 10E according to the Embodiment 5 is different from the liquid ejecting head 10 according to the Embodiment 1 in that the liquid ejecting head 10E includes a VBS line 151A instead of the VBS line 55A, and includes a VBS line 151B instead of the VBS line 55B. In the description of the Embodiment 5, the same explanations as those in the Embodiments 1 to 4 may be omitted as appropriate. The VBS line 151A represents an example of the “first common line”. The VBS line 151B represents an example of the “second common line”.

The liquid ejecting head 10E includes the VBS line 151A on the line A side and the VBS line 151B on the line B side. The VBS line 151A is electrically coupled to the common electrode 52A on the line A side. The VBS line 151B is electrically coupled to the common electrode 52B on the line B side.

The VBS line 151A includes a first portion 157A that extends in the y-axis direction, a second portion 158A that protrudes in the y1 direction from the first portion 157A, and a third portion 159A that protrudes in the x2 direction from the second portion 158A. The first portion 157A is provided in such a way as to cover the line of pressure chambers CAL when viewed in the z-axis direction. The first portion 157A has such a length in the y-axis direction that faces the line of pressure chambers CAL. The length of the first portion 157A in the y-axis direction is substantially equal to a length of the line of pressure chambers CAL.

The third portion 159A is provided with the VBS line mounting portion 56A. The VBS line 151A is electrically coupled to the COF 60 through the VBS line mounting portion 56A.

The first portion 157A includes a first end portion 157*c* and a second end portion 157*d*. The first end portion 157*c* is an end portion in the y1 direction and the second end portion 157*d* is an end portion in the y2 direction. The first end portion 157*c* is located in the y1 direction relative to the line of pressure chambers CAL. The second end portion 157*d* is located in the y2 direction relative to the line of pressure chambers CAL. A width W1 in the x-axis direction of the first end portion 157*c* is larger than a width W2 in the x-axis direction of the second end portion 157*d*. In the y-axis direction, the width W1 of the first end portion 157*c* close to the VBS line mounting portion 56A is larger than the width W2 of the second end portion 157*d* far from the VBS line mounting portion 56A. The width of the first portion 157A becomes larger as it is closer to the VBS line mounting portion 56A and becomes smaller as it is farther from the VBS line mounting portion 56A.

The VBS line 151B includes a first portion 157B that extends in the y-axis direction, a second portion 158B that protrudes in the y2 direction from the first portion 157B, and a third portion 159B that protrudes in the x1 direction from the second portion 158B. The first portion 157B is provided in such a way as to cover the line of pressure chambers CBL when viewed in the z-axis direction. The first portion 157B has such a length in the y-axis direction that faces the line of pressure chambers CBL. The length in the first portion 157B in the y-axis direction is substantially equal to a length of the line of pressure chambers CBL.

The third portion 159B is provided with the VBS line mounting portion 56B. The VBS line 151B is electrically coupled to the COF 60 through the VBS line mounting portion 56B.

The first portion 157B includes a first end portion 157*e* and a second end portion 157*f*. The first end portion 157*e* is an end portion in the y1 direction and the second end portion 157*f* is an end portion in the y2 direction. The first end portion 157*e* is located in the y1 direction relative to the line of pressure chambers CBL. The second end portion 157*f* is located in the y2 direction relative to the line of pressure chambers CBL. A width W3 in the x-axis direction of the first end portion 157*e* is smaller than a width W4 in the x-axis direction of the second end portion 157*f*. In the y-axis direction, the width W4 of the second end portion 157*f* close to the VBS line mounting portion 56B is larger than the width W3 of the first end portion 157*e* far from the VBS line mounting portion 56B. The width of the first portion 157B becomes larger as it is closer to the VBS line mounting portion 56B and becomes smaller as it is farther from the VBS line mounting portion 56B. The width W1 and the width W4 are substantially equal. The width W2 and the width W3 are substantially equal.

According to the liquid ejecting head 10E of the above-described Embodiment 5, the width of the first portion 157A of the VBS line 151A on the line A side becomes larger as it is away in the y1 direction from the center line OX and becomes smaller as it is away in the y2 direction from the center line OX. On the other hand, the width of the first portion 157B of the VBS line 151B on the line B side becomes smaller as it is away in the y1 direction from the center line OX and becomes larger as it is away in the y2 direction from the center line OX.

The liquid ejecting head 10E according to the above-described Embodiment 5 also takes into account the effects of the voltage drops due to the VBS lines 151A and 151B in the y-axis direction. According to the above-described liquid ejecting head 10E, the variation in ejection of the liquid among the nozzles N arranged in the y-axis direction is suppressed.

Embodiment 6

Figure 15:
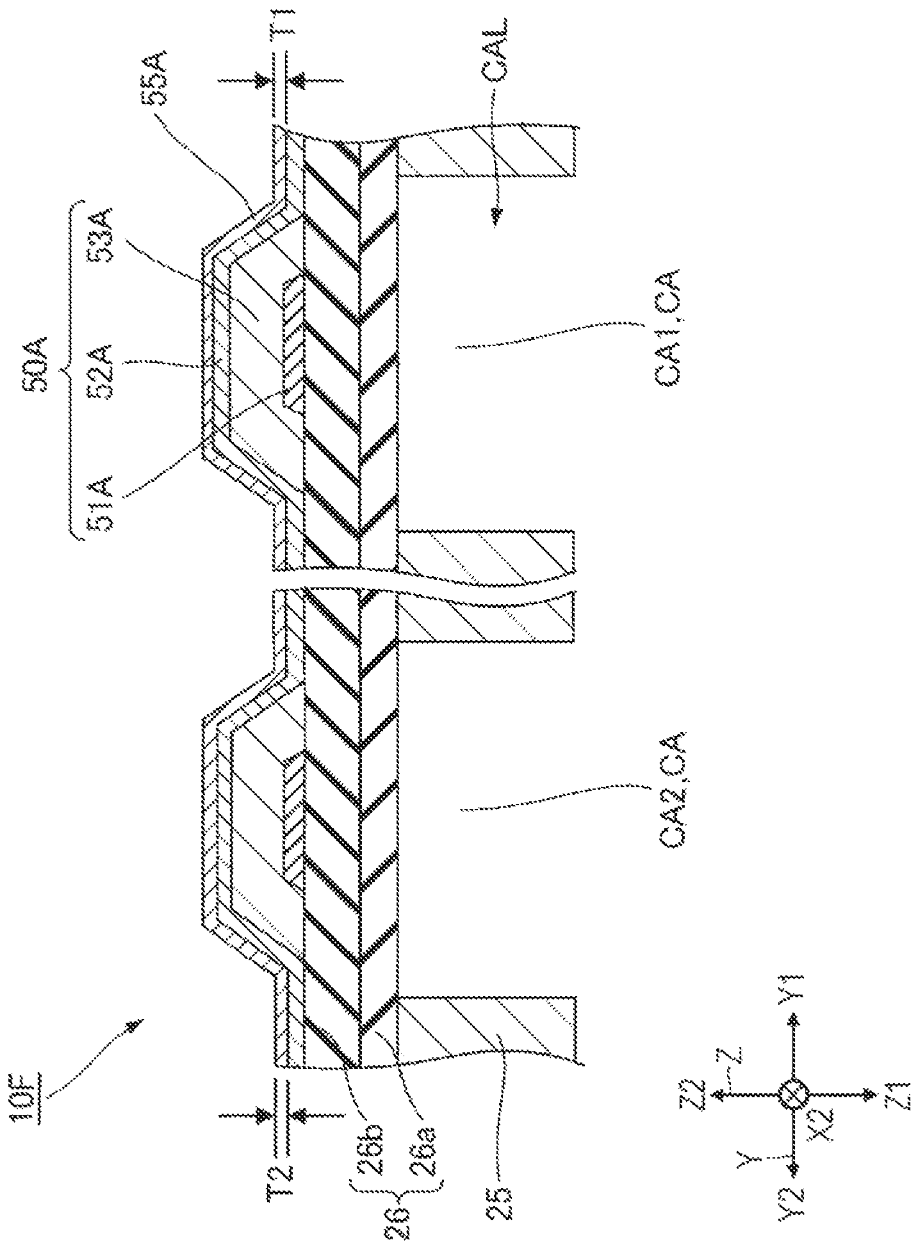
FIG. 15 is a sectional view illustrating pressure chambers on a line A side of a liquid ejecting head according to Embodiment 6.

Next, a liquid ejecting head 10F according to Embodiment 6 will be described with reference to FIGS. 15 and 16. FIG. 15 is a sectional view illustrating the pressure chambers CA1 and CA2 on the line A side of the liquid ejecting head 10F according to the Embodiment 6. The liquid ejecting head 10F according to the Embodiment 6 is different from the liquid ejecting head 10 according to the Embodiment 1 in that thicknesses T1 to T4 of the VBS lines 55A and 55B vary depending on the positions in the y-axis direction. In the description of the Embodiment 6, the same explanations as those in the Embodiments 1 to 5 may be omitted as appropriate. The thicknesses T1 to T4 represent thicknesses in the z-axis direction.

The pressure chamber CA1 illustrated in FIG. 15 is the pressure chamber CA out of the pressure chambers CA, which is located at one end in the y-axis direction. The pressure chamber CA2 is the pressure chamber CA out of the pressure chambers CA, which is located at another end in the y-axis direction. The pressure chamber CA1 is located closest in the y-axis direction to the VBS line mounting portion 56A out of the pressure chambers CA. The pressure chamber CA2 is located farthest in the y-axis direction from the VBS line mounting portion 56A out of the pressure chambers CA.

The thickness T1 of the VBS line 55A close to the pressure chamber CA1 is larger than the thickness T2 of the VBS line 55A close to the pressure chamber CA2. The thickness of the VBS line 55A becomes larger as it is located away in the y1 direction from the center line OX illustrated in FIG. 8 and becomes smaller as it is located away in the y2 direction from the center line OX.

Figure 16:
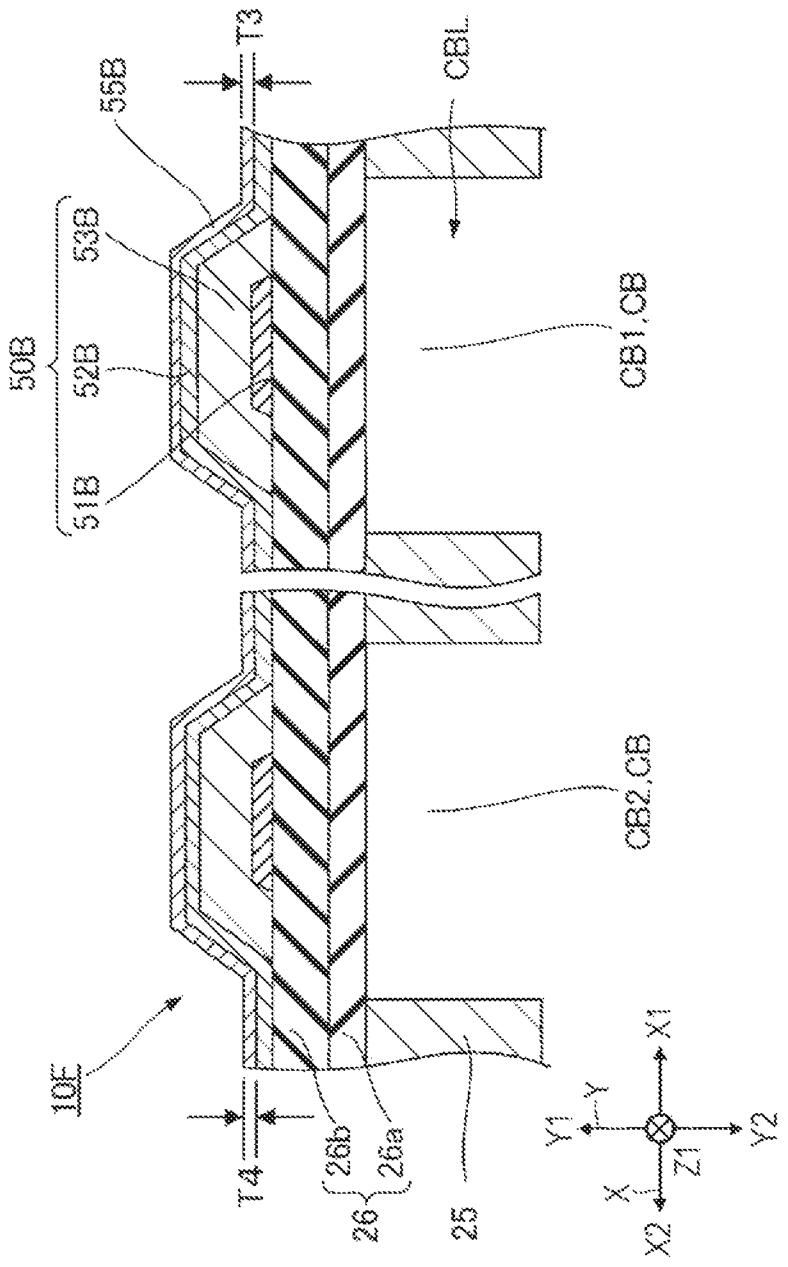
FIG. 16 is a sectional view illustrating pressure chambers on a line B side of the liquid ejecting head according to the Embodiment 6.

The pressure chamber CB1 illustrated in FIG. 16 is the pressure chamber CB out of the pressure chambers CB, which is located at one end in the y-axis direction. The pressure chamber CB2 is the pressure chamber CB out of the pressure chambers CB, which is located at another end in the y-axis direction. The pressure chamber CB1 is located farthest in the y-axis direction from the VBS line mounting portion 56B out of the pressure chambers CB. The pressure chamber CB2 is located closest in the y-axis direction to the VBS line mounting portion 56B out of the pressure chambers CB.

The thickness T3 of the VBS line 55B close to the pressure chamber CB1 is smaller than the thickness T4 of the VBS line 55B close to the pressure chamber CB2. The thickness of the VBS line 55B becomes smaller as it is located away in the y1 direction from the center line OX illustrated in FIG. 8 and becomes larger as it is located away in the y2 direction from the center line OX.

In the liquid ejecting head 10F according to the above-described Embodiment 6, the thickness of the VBS line 55A on the line A side becomes larger as it is located away in the y1 direction from the center line OX and becomes smaller as it is located away in the y2 direction from the center line OX. On the other hand, the thickness of the VBS line 55B on the line B side becomes smaller as it is located away in the y1 direction from the center line OX and becomes larger as it is located away in the y2 direction from the center line OX.

The liquid ejecting head 10F according to the above-described Embodiment 6 also takes into account the effects of the voltage drops due to the VBS lines 55A and 55B in the y-axis direction. According to the above-described liquid ejecting head 10F, the variation in ejection of the liquid among the nozzles N arranged in the y-axis direction is suppressed.

Embodiment 7

Figure 17:
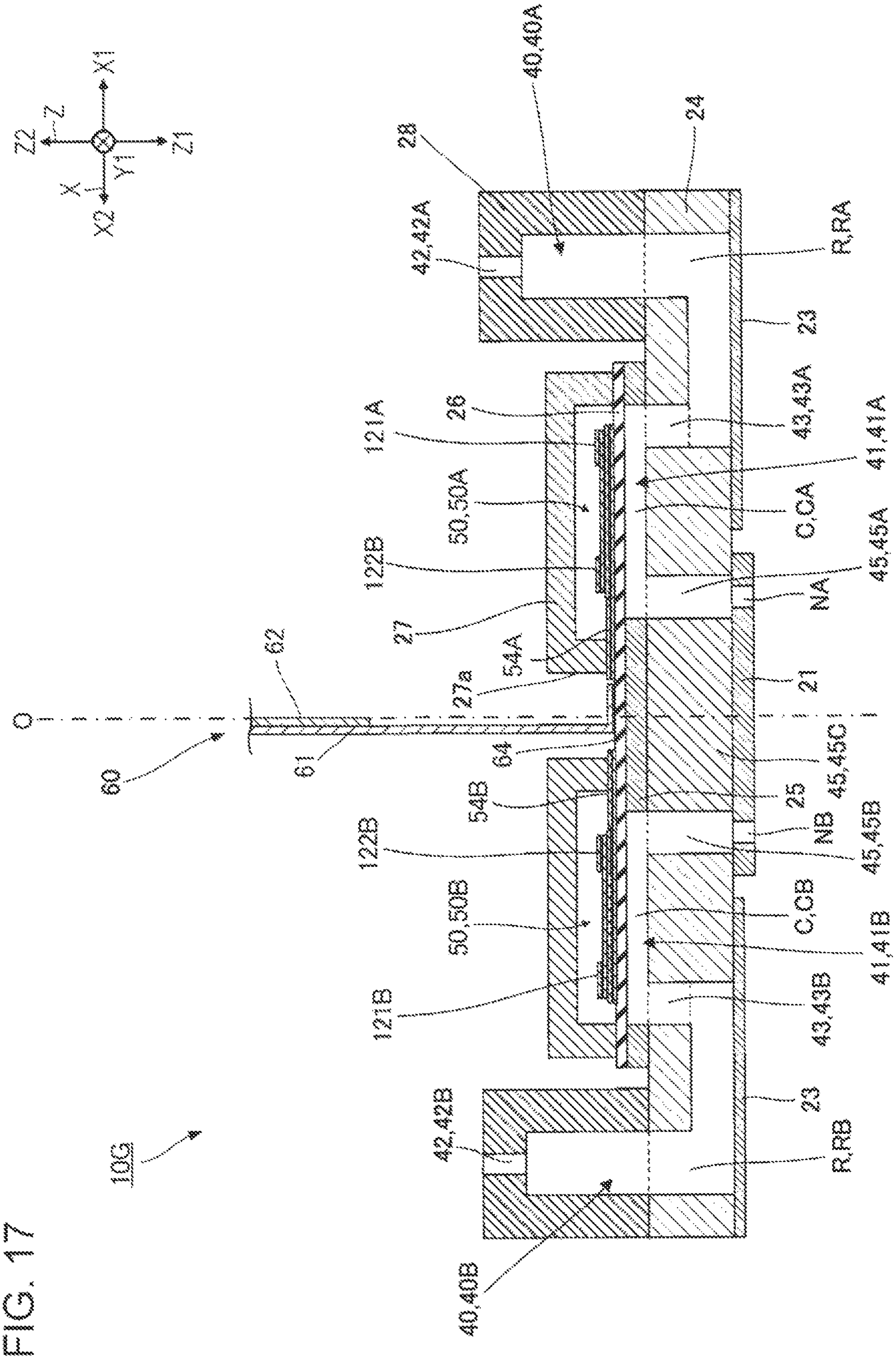
FIG. 17 is a sectional view illustrating a liquid ejecting head according to Embodiment 7.

Next, a liquid ejecting head 10G according to Embodiment 7 will be described with reference to FIGS. 11 and 17. FIG. 17 is a sectional view illustrating the liquid ejecting head 10G according to the Embodiment 7. The liquid ejecting head 10G according to the Embodiment 7 is different from the liquid ejecting head 10 according to the Embodiment 1 illustrated in FIG. 2 in that the liquid ejecting head 10G includes nozzles NA communicating with the pressure chambers CA on the line A side and nozzles NB communicating with the pressure chambers CB on the line B side separately instead of the structure including the nozzles N communicating with the pressure chambers CA on the line A side and the pressure chambers CB on the line B side in common, and includes the VBS lines 121A, 121B, 122A, and 122B instead of the VBS lines 55A and 55B. The VBS lines 121A, 121B, 122A, and 122B of the liquid ejecting head 10G according to the Embodiment 7 are the same as the VBS lines 121A, 121B, 122A, and 122B of the liquid ejecting head 10B according to the Embodiment 2 illustrated in FIG. 11. In the description of the Embodiment 7, the same explanations as those in the Embodiment 1 to 6 may be omitted as appropriate.

The liquid ejecting head 10G illustrated in FIG. 17 includes the pressure chambers CA and CB. Each pressure chamber CA communicates with the common liquid chamber RA, the relay flow channel 43A, the communication flow channel 45A, and the nozzle NA. Each pressure chamber CB communicates with the common liquid chamber RB, the relay flow channel 43B, the communication flow channel 45B, and the nozzle NB.

The liquid ejecting head 10G according to the above-described Embodiment 7 also takes into account the effects of the voltage drops due to the VBS lines 121A, 121B, 122A, and 122B in the y-axis direction. As illustrated in FIG. 11, the pressure chamber CA1 disposed at the one end in the y-axis direction is close to the VBS line mounting portion 56A and is far from the VBS line mounting portion 127A. The common electrode 52A above the pressure chamber CA1 is electrically coupled to the close VBS line mounting portion 56A through the VBS line 121A, and is electrically coupled to the far VBS line mounting portion 127A through the VBS line 122A.

The pressure chamber CA2 disposed at the other end in the y-axis direction is far from the VBS line mounting portion 56A and is close to the VBS line mounting portion 127A. The common electrode 52A above the pressure chamber CA2 is electrically coupled to the far VBS line mounting portion 56A through the VBS line 121A, and is electrically coupled to the close VBS line mounting portion 127A through the VBS line 122A. The common electrode 52B to the pressure chambers CB, CB1, and CB2 on the line B side is also electrically coupled to the VBS line mounting portions 56B and 176B located on mutually opposite sides, respectively.

According to the liquid ejecting head 10G of the above-described Embodiment 7, the effects of the voltage drops due to the VBS lines 121A, 121B, 122A, and 122B in the y-axis direction are taken into account. Thus, the variation in ejection of the liquid among the nozzles NA and NB arranged in the y-axis direction is suppressed.

The liquid ejecting head 10G according to the Embodiment 7 includes the VBS lines 121A, 121B, 122A, and 122B as well as the VBS line mounting portions 56A, 56B, 127A, and 127B, which are the same as those of the Embodiment 2 illustrated in FIG. 11. However, the layout of the VBS lines 121A, 121B, 122A, and 122B as well as the VBS line mounting portions 56A, 56B, 127A, and 127B is not limited only to the foregoing. The liquid ejecting head 10G may be configured to include the VBS lines 121A, 121B, 122A, 122B, 131A, 131B, 132A, and 132B as illustrated in FIG. 12 or 13. The VBS lines 121A, 121B, 122A, and 122B of the liquid ejecting head 10G may have the thicknesses T1 to T4 that vary depending on the positions in the y-axis direction as with the Embodiment 6.

Liquid Ejecting Apparatus

Figure 19:
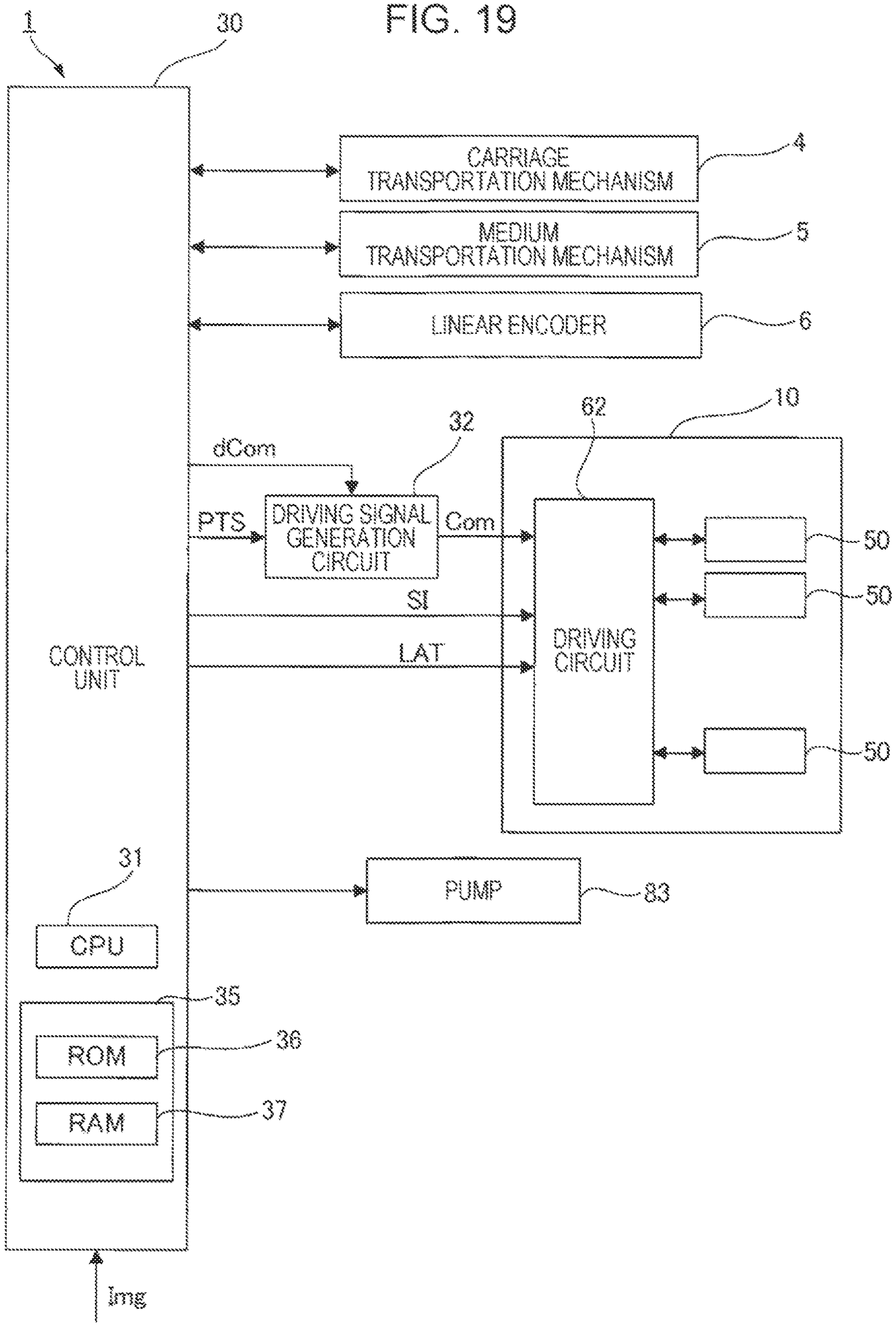
FIG. 19 is a block diagram illustrating the liquid ejecting apparatus including the liquid ejecting head.

Next, a liquid ejecting apparatus 1 including the liquid ejecting head 10 will be described with reference to FIGS. 18 and 19. FIG. 18 is a schematic diagram illustrating the liquid ejecting apparatus 1 including the liquid ejecting head 10. The liquid ejecting apparatus 1 includes the liquid ejecting head 10 according to the above-described Embodiment 1. FIG. 19 is a block diagram illustrating the liquid ejecting apparatus 1. The liquid ejecting apparatus 1 is not limited to the structure that includes the liquid ejecting head 10 according to the Embodiment 1. The liquid ejecting apparatus 1 may include any of the liquid ejecting heads 10B to 10G according to the Embodiments 2 to 7 instead of the liquid ejecting head 10 according to the Embodiment 1.

The liquid ejecting apparatus 1 is an ink jet type printing apparatus that ejects an ink in the form of droplets, which represents an example of a "liquid", onto a medium PA. The liquid ejecting apparatus 1 is a serial type printing apparatus. The medium PA is typically a sheet of printing paper. The medium PA is not limited only to the printing paper, and may be a printing target of a desired material such as a resin film and a cloth.

The liquid ejecting apparatus 1 includes the liquid ejecting head 10 that ejects inks, the liquid containers 2 that store inks, a carriage 3 that mounts the liquid ejecting head 10, a carriage transportation mechanism 4 that transports the carriage 3, a medium transportation mechanism 5 that transports the medium PA, and the control unit 30. The control unit 30 is a control unit that controls ejection of the liquids.

Examples of specific aspects of the liquid container 2 include a cartridge attachable to and detachable from the liquid ejecting apparatus 1, an ink pack in the form of a bag formed from a flexible film, and an ink-refillable ink tank. An arbitrary type of the ink may be stored in the liquid container 2. The liquid ejecting apparatus 1 includes multiple liquid containers 2 corresponding to inks of four colors, for instance. Examples of the inks of four colors include cyan, magenta, yellow, and black inks. The liquid containers 2 may be mounted on the carriage 3.

The liquid ejecting apparatus 1 includes the circulation mechanism 8 that circulates the inks. The circulation mechanism 8 includes the supply flow channels 81 that supply the inks to the liquid ejecting head 10, the collection flow channels 82 that collect the inks discharged from the liquid ejecting head 10, and the pumps 83 that transfer the inks.

The carriage transportation mechanism 4 includes a transportation belt 4*a* for transporting the carriage 3, and a motor. The medium transportation mechanism 5 includes a transportation roller 5*a* for transporting the medium PA, and a motor. The carriage transportation mechanism 4 and the medium transportation mechanism 5 are controlled by the control unit 30. The liquid ejecting apparatus 1 causes the carriage transportation mechanism 4 to transport the carriage 3 while causing the medium transportation mechanism 5 to transport the medium PA, and performs printing by ejecting the ink droplets onto the medium PA.

As illustrated in FIG. 19, the liquid ejecting apparatus 1 includes a linear encoder 6. The linear encoder 6 is provided at a position where it is possible to detect a position of the carriage 3. The linear encoder 6 obtains information concerning the position of the carriage 3. The linear encoder 6 outputs an encoder signal to the control unit 30 along with a movement of the carriage 3.

The control unit 30 includes one or more CPUs 31. The control unit 30 may include an FPGA instead of or in addition to the CPUs 31. The control unit 30 includes a storage unit 35. The storage unit 35 includes a ROM 36 and a RAM 37, for example. The storage unit 35 may include an EEPROM or a PROM. The storage unit 35 can store print data Img supplied from a host computer. The storage unit 35 stores a control program for the liquid ejecting apparatus 1.

The CPU stands for central processing unit. The FPGA stands for field-programmable gate array. The RAM stands for random access memory. The ROM stands for read only memory. the EEPROM stands for electrically erasable programmable read only memory. The PROM stands for programmable ROM.

The control unit 30 generates signals for controlling operations of the respective units in the liquid ejecting apparatus 1. The control unit 30 can generate a print signal SI and a waveform designation signal dCom. The print signal SI is a digital signal for defining a type of an operation of the liquid ejecting head 10. The print signal SI can designate whether or not to supply the driving signal Com to each piezoelectric element 50. The waveform designation signal dCom is a digital signal that defines a waveform of the driving signal Com. The driving signal Com is an analog signal for driving the piezoelectric element 50.

The liquid ejecting apparatus 1 includes the driving signal generation circuit 32. The driving signal generation circuit 32 is electrically coupled to the control unit 30. The driving signal generation circuit 32 includes a DA converter circuit. The driving signal generation circuit 32 generates the driving signal Com having the waveform defined by the waveform designation signal dCom. When the control unit 30 receives the encoder signal from the linear encoder 6, the control unit 30 outputs a timing signal PTS to the driving signal generation circuit 32. The timing signal PTS defines timing to generate the driving signal Com. The driving signal generation circuit 32 outputs the driving signal Com every time the driving signal generation circuit 32 receives the timing signal PTS.

The driving circuit 62 is electrically coupled to the control unit 30 and to the driving signal generation circuit 32. The driving circuit 62 switches whether or not to supply the driving signal Com to the piezoelectric element 50 based on the print signal SI. The driving circuit 62 can select the piezoelectric element 50, to which the driving signal Com is supplied, based on the print signal SI, a latch signal LAT, and a change signal CH that are supplied from the control unit 30. The latch signal LAT defines timing to latch the print data Img. The change signal CH defines timing to select a driving pulse included in the driving signal Com.

The control unit 30 controls an ink ejection operation by the liquid ejecting head 10. As described above, the control unit 30 drives the piezoelectric element 50 so as to change the pressure of the ink inside the pressure chamber C, thereby ejecting the ink from the nozzle N. The control unit 30 controls the ejection operation when performing a printing operation.

This liquid ejecting apparatus 1 can apply the above-described liquid ejecting head 10. In the liquid ejecting apparatus 1 including the liquid ejecting head 10, the VBS line mounting portion 56A on the line A side and the VBS line mounting portion 56B on the line B side are disposed on mutually opposite sides in the y-axis direction. The voltage is supplied in mutually opposite directions to the VBS line 55A on the line A side and to the VBS line 55B on the line B side. Thus, the effects of the voltage drops based on the distances from the VBS line mounting portions 56A and 56B are cancelled between the piezoelectric elements 50A on the line A side and the piezoelectric elements 50B on the line B side. Accordingly, the variation in ejection of the liquid between the nozzles N is suppressed. As a consequence, reliability of the liquid ejecting apparatus 1 including the liquid ejecting head 10 is improved.

Modified Example 1

Next, a liquid ejecting head 10 according to Modified Example 1 will be described. The liquid ejecting head 10 according to the Modified Example 1 is different from the liquid ejecting head 10 according to the Embodiments in that widths in the x-axis direction of the VBS lines 55A and 55B are different depending on positions in the y-axis direction. The same explanations as the explanations in the above-described Embodiments 1 to 7 may be omitted as appropriate.

In the liquid ejecting head 10 according to the Modified Example 1, the VBS line mounting portion 56A is disposed on an end on one side while the VBS line mounting portion 56B is disposed on an end on another side. The VBS line 55A is electrically coupled to the VBS line mounting portion 56A and the VBS line 55B is electrically coupled to the VBS line mounting portion 56B.

In the liquid ejecting head 10 according to the Modified Example 1, the VBS line 55A on the line A side is formed such that electric resistance of the VBS line 55A is gradually reduced from the one side to the other side in the y-axis direction. To be more precise, a width W11 at the end on the one side of the VBS line 55A is smaller than a width W12 at the end on the other side of the VBS line 55A. The width W11 and the width W1 indicated in FIG. 14 are measured at the same position in the y-axis direction, and the width W12 and the width W2 are measured at the same position in the y-axis direction.

In the liquid ejecting head 10 according to the Modified Example 1, the VBS line 55B on the line B side is formed such that electric resistance of the VBS line 55B is gradually reduced from the other side to the one side in the y-axis direction. To be more precise, a width W13 at the end on the one side of the VBS line 55B is larger than a width W14 at the end on the other side of the VBS line 55B. The width W13 and the width W3 indicated in FIG. 14 are measured at the same position in the y-axis direction, and the width W14 and the width W4 are measured at the same position in the y-axis direction.

The liquid ejecting head 10 according to the above-described Modified Example 1 also takes into account the effects of the voltage drops due to the VBS lines 55A and 55B in the y-axis direction. Accordingly, the variation in ejection of the liquid among the nozzles NA and NB arranged in the y-axis direction is suppressed.

Modified Example 2

Next, a liquid ejecting head 10 according to Modified Example 2 will be described. The liquid ejecting head 10 according to the Modified Example 2 is different from the liquid ejecting head 10 according to the Embodiments in that thicknesses in the z-axis direction of the VBS lines 55A and 55B vary depending on positions in the y-axis direction. The same explanations as the explanations in the above-described Embodiments 1 to 7 and Modified Example 1 may be omitted as appropriate.

In the liquid ejecting head 10 according to the Modified Example 2, the VBS line 55A on the line A side is formed such that electric resistance of the VBS line 55A is gradually reduced from the one side to the other side in the y-axis direction. To be more precise, a thickness T11 at the end on the one side of the VBS line 55A is smaller than a thickness T12 at the end on the other side of the VBS line 55A (T11<T12).

In the liquid ejecting head 10 according to the Modified Example 2, the VBS line 55B on the line B side is formed such that electric resistance of the VBS line 55B is gradually decreased from the other side to the one side in the y-axis direction. To be more precise, a thickness T13 at the end on the one side of the VBS line 55B is larger than a thickness T14 at the end on the other side of the VBS line 55B (T13>T14).

The liquid ejecting head 10 according to the above-described Modified Example 2 also takes into account the effects of the voltage drops due to the VBS lines 55A and 55B in the y-axis direction. Accordingly, the variation in ejection of the liquid among the nozzles NA and NB arranged in the y-axis direction is suppressed.

The above-described Embodiments merely demonstrate representative examples of the present disclosure. The present disclosure is not limited only to the above-described Embodiments, and various modifications and additions are possible within the range not departing from the gist of the present disclosure.

The above-described Embodiments exemplify the case in which the VBS lines 55A and 55B are electrically coupled to the COF 60 on the outer sides of the lines of pressure chambers CAL and CBL in the y-axis direction. However, the positions where the VBS lines 55A and 55B are electrically coupled to the COF 60 are not limited only to this configuration. For example, the position where the VBS line 55A is electrically coupled to the COF 60 may be a position shifted in the y1 direction from the center line OX. The position where the VBS line 55B is electrically coupled to the COF 60 may be a position shifted in the y2 direction from the center line OX. For example, the position where the VBS line 55A is electrically coupled to the COF 60 may be a position overlapping the line of pressure chambers CAL when viewed in the z-axis direction and being shifted in the y1 direction from the center line OX. The position where the VBS line 55B is electrically coupled to the COF 60 may be a position overlapping the line of pressure chambers CBL when viewed in the z-axis direction and being shifted in the y2 direction from the center line OX. The “one side” is not limited to the position shifted in the y1 direction from the center line OX and may be position shifted in the y2 direction. Likewise, the “other side” is not limited to the position shifted in the y2 direction from the center line OX and may be position shifted in the y1 direction. The “one side” and the “other side” are mutually opposite sides based on the center line OX.

In the above-described Embodiment 1, the VBS line 55A is electrically coupled to the COF 60 at the position on the one side, but is not electrically coupled to the COF 60 at a position on the other side. Likewise, in the Embodiment 1, the VBS line 55B is electrically coupled to the COF 60 at the position on the other side, but is not electrically coupled to the COF 60 at a position on the one side.

The COM line 54A, the COM line 54B, the VBS line 55A, and the VBS line 55B are electrically coupled to the COF 60, respectively. Nonetheless, the COM line 54A, the COM line 54B, the VBS line 55A, and the VBS line 55B are coupled to different wiring portions of the COF 60 and are not coupled to a common wiring portion.

The VBS line 55A is provided such that its wiring resistance varies gradually from the one side to the other side in the y-axis direction, and the VBS line 55B is provided such that its wiring resistance varies gradually from the other side to the one side in the y-axis direction. As described above, the wiring resistance can be made variable by changing the width of each VBS line or changing the thickness of the VBS line.

For example, the VBS line on the line A side may be provided such that its wiring resistance is gradually increased from the one side to the other side in the y-axis direction, and the VBS line on the line B side may be provided such that its wiring resistance is gradually increased from the other side to the one side in the y-axis direction.

For example, the VBS line on the line A side may be provided such that its wiring resistance is gradually decreased from the one side to the other side in the y-axis direction, and the VBS line on the line B side may be provided such that its wiring resistance is gradually decreased from the other side to the one side in the y-axis direction.

The above-described Embodiment 1 shows the example of the liquid ejecting head 10 configured to circulate the liquid. However, the present disclosure is also applicable to a liquid ejecting head 10 not configured to circulate the liquid.

The above-described Embodiment 1 exemplifies the case where two pressure chambers in total, namely, one first pressure chamber CA and one second pressure chamber CB communicate with one nozzle N. Instead, four pressure chambers in total, namely, two pressure first chambers CA adjacent to each other in the y-axis direction and two second pressure chambers CB adjacent to each other in the y-axis direction may communicate with one nozzle N.

The above-described Embodiments shows the example of the serial type liquid ejecting apparatus that reciprocates the carriage mounting the liquid ejecting head 10 in the width direction of the medium PA. Instead, the present disclosure is also applicable to a line type liquid ejecting apparatus 1 provided with a line head that mounts multiple liquid ejecting heads 10.

The liquid ejecting apparatus 1 shown as the example in any of the above-described Embodiments can be adopted to various apparatuses such as a facsimile apparatus and a copier besides the apparatus dedicated for printing. After all, the use of the liquid ejecting apparatus of the present disclosure is not limited only to the printing. For example, a liquid ejecting apparatus configured to eject a solution of a coloring material is used as a manufacturing apparatus for forming color filters of display devices such as liquid crystal display panels. A liquid ejecting apparatus configured to eject a solution of a conductive material is used as a manufacturing apparatus for forming wiring and electrodes on wiring boards. A liquid ejecting apparatus configured to eject a solution of a biological organic substance is used as a manufacturing apparatus for manufacturing biochips, for example.

What is claimed is:

1. A liquid ejecting head comprising:

a line of first pressure chambers including a plurality of first pressure chambers arranged in a first direction;

a line of second pressure chambers including a plurality of second pressure chambers arranged in the first direction, the line of second pressure chambers being provided at a different position from the first pressure chambers in a second direction intersecting with the first direction;

a line of nozzles including a plurality of nozzles arranged in the first direction and communicating with the first pressure chambers and the second pressure chambers in common, respectively;

first piezoelectric bodies provided corresponding to the plurality of first pressure chambers;

first individual electrodes individually provided to the plurality of first pressure chambers and being electrically coupled to the first piezoelectric bodies;

a first common electrode provided in common to the plurality of first pressure chambers and electrically coupled to the first piezoelectric bodies;

second piezoelectric bodies provided corresponding to the plurality of second pressure chambers;

second individual electrodes individually provided to the plurality of second pressure chambers and being electrically coupled to the second piezoelectric bodies;

a second common electrode provided in common to the plurality of second pressure chambers and electrically coupled to the second piezoelectric bodies;

a wiring member that supplies a voltage to the first individual electrodes, the first common electrode, the second individual electrodes, and the second common electrode;

a first individual line that electrically couples the first individual electrode to the wiring member;

a first common line that electrically couples the first common electrode to the wiring member;

a second individual line that electrically couples the second individual electrode to the wiring member; and a second common line that electrically couples the second common electrode to the wiring member, wherein the wiring member is electrically coupled to the first common line at a position shifted to one side in the first direction relative to a center in the first direction of the lines of first and second pressure chambers, and the wiring member is electrically coupled to the second common line at a position shifted to another side in the first direction relative to the center in the first direction of the lines of first and second pressure chambers.

2. The liquid ejecting head according to claim 1, wherein the wiring member is electrically coupled to the first common line at a position on the one side relative to an end on the one side of the lines of first and second pressure chambers, and the wiring member is electrically coupled to the second common line at a position on the other side relative to an end on the other side of the lines of first and second pressure chambers.

3. The liquid ejecting head according to claim 1, wherein the first common line is provided in such a way as to increase wiring resistance gradually from the one side to the other side in the first direction, and the second common line is provided in such a way as to increase wiring resistance gradually from the other side to the one side in the first direction.

4. The liquid ejecting head according to claim 3, wherein the first common line is provided in such a way as to decrease a width in the second direction gradually from the one side to the other side in the first direction, and the second common line is provided in such a way as to decrease a width in the second direction gradually from the other side to the one side in the first direction.

5. The liquid ejecting head according to claim 3, wherein the first common line is provided in such a way as to decrease a width in a third direction gradually from the one side to the other side in the first direction, the third direction intersecting with both the first direction and the second direction, and the second common line is provided in such a way as to decrease a width in the third direction gradually from the other side to the one side in the first direction.

6. The liquid ejecting head according to claim 1, wherein the first common line is provided in such a way as to decrease wiring resistance gradually from the one side to the other side in the first direction, and the second common line is provided in such a way as to decrease wiring resistance gradually from the other side to the one side in the first direction.

7. The liquid ejecting head according to claim 6, wherein the first common line is provided in such a way as to increase a width in the second direction gradually from the one side to the other side in the first direction, and the second common line is provided in such a way as to increase a width in the second direction gradually from the other side to the one side in the first direction.

8. The liquid ejecting head according to claim 6, wherein the first common line is provided in such a way as to increase a width in a third direction gradually from the one side to the other side in the first direction, the third direction intersecting with both the first direction and the second direction, and the second common line is provided in such a way as to increase a width in the third direction gradually from the other side to the one side in the first direction.

9. The liquid ejecting head according to claim 1, wherein the first individual lines are provided in a range overlapping the first pressure chambers in the first direction, and the second individual lines are provided in a range overlapping the second pressure chambers in the first direction.

10. The liquid ejecting head according to claim 1, further comprising:

a common supply flow channel that communicates with the plurality of first pressure chambers in common and supplies a liquid; and a common discharge flow channel that communicates with the plurality of second pressure chambers in common and discharges the liquid.

11. The liquid ejecting head according to claim 1, further comprising:

a third common line that electrically couples the first common electrode to the wiring member, the third common line being different from the first common line; and a fourth common line that electrically couples the second common electrode to the wiring member, the fourth common line being different from the second common line, wherein the wiring member is electrically coupled to the third common line at a position shifted to the other side in the first direction relative to the center in the first direction of the lines of first and second pressure chambers, and the wiring member is electrically coupled to the fourth common line at a position shifted to the one side in the first direction relative to the center in the first direction of the lines of first and second pressure chambers.

12. The liquid ejecting head according to claim 11, wherein the third common line is electrically coupled to the first common electrode at a position closer in the second direction to the line of second pressure chambers than to the first common line, and the fourth common line is electrically coupled to the second common electrode at a position closer in the second direction to the line of first pressure chambers than to the second common line.

13. The liquid ejecting head according to claim 12, wherein the first common line is electrically coupled to the third common line, and the second common line is electrically coupled to the fourth common line.

14. The liquid ejecting head according to claim 11, wherein the third common line is electrically coupled to the first common electrode at a position closer in the second direction to the line of second pressure chambers than to the first common line, the fourth common line is electrically coupled to the second common electrode at a position farther in the second direction from the line of first pressure chambers than from the second common line, the first common line is electrically coupled to the fourth common line, and the second common line is electrically coupled to the third common line.

15. A liquid ejecting apparatus comprising:

the liquid ejecting head according to claim 1; and a control unit that controls an operation of ejection from the liquid ejecting head.

16. A liquid ejecting head comprising:

a line of first pressure chambers including a plurality of first pressure chambers arranged in a first direction;

a line of second pressure chambers including a plurality of second pressure chambers arranged in the first direction, the line of second pressure chambers being provided at a different position from the first pressure chambers in a second direction intersecting with the first direction;

a line of first nozzles including a plurality of first nozzles arranged in the first direction and communicating with the plurality of first pressure chambers, respectively;

a line of second nozzles including a plurality of second nozzles arranged in the first direction and communicating with the plurality of second pressure chambers, respectively;

first piezoelectric bodies provided corresponding to the plurality of first pressure chambers;

first individual electrodes individually provided to the plurality of first pressure chambers and being electrically coupled to the first piezoelectric bodies;

a first common electrode provided in common to the plurality of first pressure chambers and electrically coupled to the first piezoelectric bodies;

second piezoelectric bodies provided corresponding to the plurality of second pressure chambers;

second individual electrodes individually provided to the plurality of second pressure chambers and being electrically coupled to the second piezoelectric bodies;

a second common electrode provided in common to the plurality of second pressure chambers and electrically coupled to the second piezoelectric bodies;

a wiring member that supplies a voltage to the first individual electrodes, the first common electrode, the second individual electrodes, and the second common electrode;

a first individual line that electrically couples the first individual electrode to the wiring member;

a first common line that electrically couples the first common electrode to the wiring member;

a second individual line that electrically couples the second individual electrode to the wiring member; and a second common line that electrically couples the second common electrode to the wiring member, wherein the wiring member is electrically coupled to the first common line at a position shifted to one side in the first direction relative to a center in the first direction of the lines of first and second pressure chambers, and the wiring member is electrically coupled to the second common line at a position shifted to another side in the first direction relative to the center in the first direction of the lines of first and second pressure chambers.

* * * * *